(12) United States Patent
Tomasko et al.

(10) Patent No.: US 10,704,698 B2
(45) Date of Patent: Jul. 7, 2020

(54) SAFETY HEAD

(75) Inventors: John Tomasko, Limerick (IE); Geoffrey Brazier, Woodbury, MN (US)

(73) Assignee: BS&B Safety Systems Limited, Limerick (IE)

( * ) Notice: Subject to any disclaimer, the term of this patent is extended or adjusted under 35 U.S.C. 154(b) by 838 days.

(21) Appl. No.: 14/343,436

(22) PCT Filed: Sep. 7, 2012

(86) PCT No.: PCT/US2012/054297
§ 371 (c)(1),
(2), (4) Date: Mar. 30, 2015

(87) PCT Pub. No.: WO2013/036858
PCT Pub. Date: Mar. 14, 2013

(65) Prior Publication Data
US 2015/0211647 A1    Jul. 30, 2015

Related U.S. Application Data

(60) Provisional application No. 61/573,126, filed on Sep. 8, 2011.

(51) Int. Cl.
*F16K 17/40* (2006.01)
*F16K 17/16* (2006.01)
(Continued)

(52) U.S. Cl.
CPC .............. *F16K 13/04* (2013.01); *F16K 17/16* (2013.01); *F16K 17/1606* (2013.01);
(Continued)

(58) Field of Classification Search
CPC ...... F16K 13/04; F16K 17/16; F16K 17/1606; F16L 23/18; F16L 23/032; Y10T 137/1692
(Continued)

(56) References Cited

U.S. PATENT DOCUMENTS 2,194,159 A    3/1940 Bonyun et al.
2,524,052 A *  10/1950 Grant, Jr. ................ F16L 29/02
                                                    137/596

(Continued)

FOREIGN PATENT DOCUMENTS

CN    201884847 U    6/2011

OTHER PUBLICATIONS

International Search Report from the European Patent Office for International Application No. PCT/US2012/054297, dated Mar. 4, 2013.

(Continued)

*Primary Examiner* — Minh Q Le
(74) *Attorney, Agent, or Firm* — Finnegan, Henderson, Farabow, Garrett & Dunner, LLP

(57) ABSTRACT

A safety head is disclosed. More particularly, a safety head comprising a circular flange portion and at least one protrusion is disclosed, wherein the at least one protrusion has a face exhibiting a blended radius of curvature. The circular flange portion may be thicker than the at least one protrusion. A safety head assembly is also disclosed, wherein the safety head assembly comprises an inlet safety head and an outlet safety head. Additionally, a safety head assembly is disclosed wherein the inlet safety head comprises a peripheral protrusion, the outlet safety head comprises a peripheral protrusion, and a clamp ring is configured to engage with the peripheral protrusions.

28 Claims, 37 Drawing Sheets

(51) Int. Cl.
*F16L 23/032* (2006.01)
*F16L 23/18* (2006.01)

(52) U.S. Cl.
CPC ............. *F16L 23/032* (2013.01); *F16L 23/18* (2013.01); *Y10T 137/1692* (2015.04)

(58) Field of Classification Search
USPC ......... 137/68.19, 68.21, 68.23, 68.24, 68.25; 285/412, 2, 405, 408
See application file for complete search history.

(56) References Cited

U.S. PATENT DOCUMENTS

| | | | | |
|---|---|---|---|---|
| 3,643,983 | A * | 2/1972 | Ludeman | F16L 23/006 285/31 |
| 4,073,402 | A * | 2/1978 | Wood | F16K 17/1606 137/68.26 |
| 4,077,233 | A * | 3/1978 | Hornig | B60K 17/22 464/180 |
| 4,263,929 | A * | 4/1981 | Kearney | F16K 17/16 137/557 |
| 4,429,903 | A * | 2/1984 | Baker | F16K 27/00 285/24 |
| 4,597,505 | A * | 7/1986 | Mozley | F16K 17/1613 137/68.21 |
| 4,610,471 | A * | 9/1986 | Halen | F16L 47/14 285/148.13 |
| 4,620,732 | A * | 11/1986 | Marshall | F16L 23/003 285/368 |
| 4,751,938 | A * | 6/1988 | Kerns | F16K 17/16 137/68.25 |
| 5,316,213 | A * | 5/1994 | Gooderham | F16T 1/10 137/454.2 |
| 5,546,976 | A * | 8/1996 | Farquhar | F16T 1/38 137/183 |
| 5,570,803 | A | 11/1996 | Farwell | |
| 5,678,307 | A | 10/1997 | Farwell | |
| 6,178,983 | B1 | 1/2001 | Culliinane et al. | |
| 6,311,715 | B1 * | 11/2001 | Wadkins | F16K 17/16 137/68.23 |
| 6,321,582 | B1 | 11/2001 | Cullinane et al. | |
| 6,446,653 | B2 * | 9/2002 | Cullinane | F16K 17/1606 137/68.25 |
| 6,983,758 | B2 * | 1/2006 | DeCourcy | B08B 5/02 137/240 |
| 7,530,370 | B2 * | 5/2009 | Gross | B63B 13/02 114/198 |
| 2001/0011471 | A1 * | 8/2001 | Cullinane | F16K 17/1606 72/379.2 |
| 2004/0046391 | A1 * | 3/2004 | Vasudeva | F01N 13/16 285/368 |
| 2006/0049635 | A1 * | 3/2006 | Brazier | F16K 17/16 285/412 |
| 2010/0059988 | A1 * | 3/2010 | Matsumoto | F16L 17/073 285/148.28 |
| 2015/0115603 | A1 * | 4/2015 | Trombley | F16L 19/0218 285/368 |

OTHER PUBLICATIONS

Office Action, Chinese Application No. 201610941391.6 (dated Jul. 3, 2018) (6 pages), with English-language translation (6 pages) (12 pages total).

Office Action, Chinese Application No. 201610941391.6 (dated May 28, 2019) (4 pages), with English-language translation (5 pages) (9 pages total).

\* cited by examiner

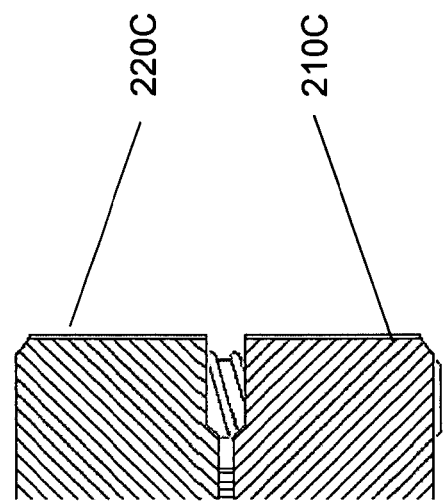
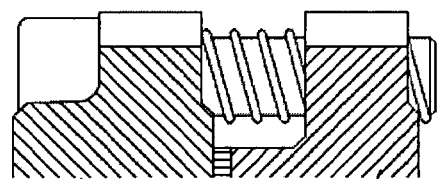
Fig. 2C (Prior Art)
Fig. 2B

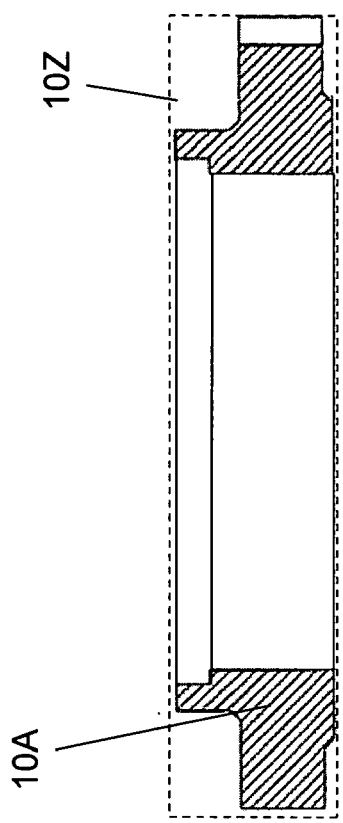
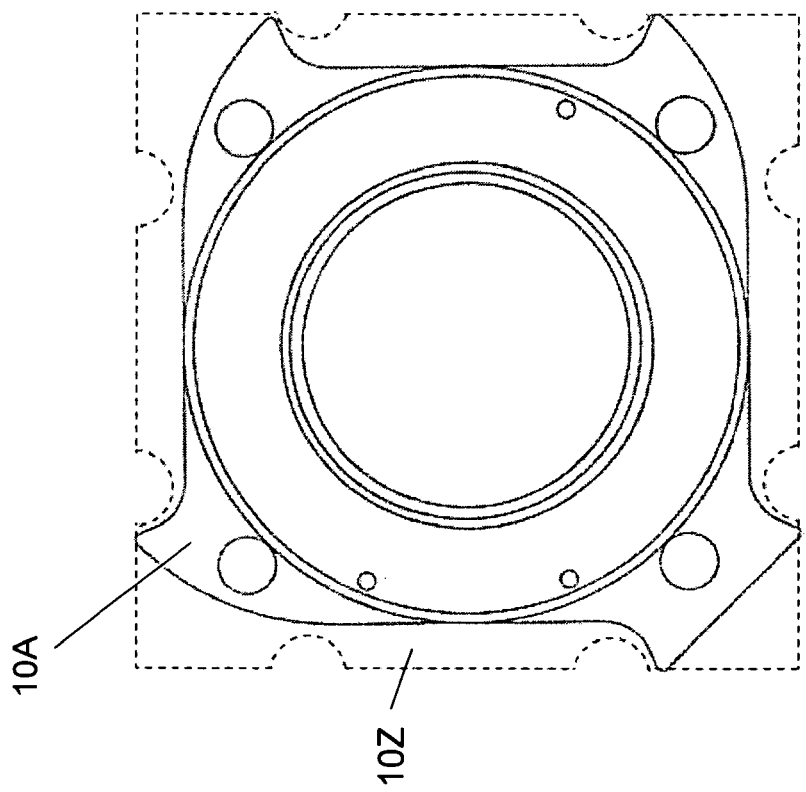
FIG 2E
FIG 2D

SAFETY HEAD

CROSS-REFERENCE TO RELATED APPLICATIONS

This application claims the benefit of U.S. Provisional Application No. 61/573,126, filed Sep. 8, 2011, by John Tomasko et al. and titled SAFETY HEAD, the disclosure of which is expressly incorporated herein by reference.

TECHNICAL FIELD

The present disclosure relates generally to a supporting structure and related method for installing an insert device between bolted flanges. More particularly, the present disclosure relates to a safety head apparatus that can be sealingly clamped between bolted flanges.

BACKGROUND

There are a number of insert devices designed to be inserted within a pressurized system. Exemplary insert devices may include pressure relief devices, such as valves and rupture disks. Pressure release devices may be configured to allow pressurized fluid to vent from one part of a pressurized system in response to a dangerous over-pressure situation. Other exemplary insert devices include sensors and measuring equipment. Typically, an insert device may be installed into a pressurized system between two companion flanges, which are held together by way of flange bolts.

In the field of pressurized systems, a number of different flange bolting patterns exist for pipes of a given nominal size. By way of example, for pipes of a given nominal size, different bolting patterns may be required by each of the standards required by the American National Standards Institute ("ANSI"), American Society of Mechanical Engineers ("ASME"), Deutsches Institut für Normung ("DIN"), and Japanese Industrial Standards ("JIS"). Additionally, for pipes of a given nominal size and/or standard, different bolting patterns are required for different pressure ratings. Therefore, it is desirable for an insert device to fit interchangeably within pressurized systems having a variety of flange bolting patterns.

An insert device's performance depends on two principal factors: proper alignment within a pressurized system and proper sealing within a pressurized system. First, if the insert device is a rupture disk, for example, it is desirable for the rupture disk to be aligned as close as possible to the center of the fluid flow path of the pressurized system. Centering or aligning the rupture disk stabilizes flow resistance ($K_r$) when the rupture disk ruptures, which desirably increases (or otherwise optimizes or stabilizes) the rate at which an over-pressure fluid may exit the system. Second, for any insert device, a proper seal will prevent fluid from leaking into the environment.

One type of insert device achieves proper alignment through the use of a flange adapter. The insert device may align with a flange adapter, which in turn is configured to align with a set of flange bolts. Optimally, a flange adapter is configured to fit a number of bolt configurations for the same nominal size pipe. One flange adapter providing this feature is illustrated in co-owned U.S. patent application Ser. No. 10/936,761, the entire contents of which are incorporated herein by reference.

Known flange adapters may present disadvantages when sealed within a pressurized system. The quality of a flange adapter's seal depends largely on the torque values applied to the flange bolts. An installer may lack the tools or expertise to provide an optimal torque to the flange bolts; therefore, in practice many insert devices may provide less than optimal sealing as a result of improper installation. Additionally, the seal of a flange adapter may depend on the alignment of the companion flanges between which it is installed. For example, factors such as the perpendicularity, parallelism, and concentricity of mating surfaces may influence the sealing arrangement between an insert device (e.g., rupture disk) and its holder, as well as the sealing arrangement between the holder and the companion flanges. In practice, two companion flanges rarely align precisely with each other. A flange adapter or insert device installed between such misaligned flanges may not provide an optimal seal.

Another type of insert device may be installed into a pressurized system with the help of a support apparatus or a safety head assembly. A support apparatus may include an inlet support member and an outlet support member. Assembly bolts hold the two support members together, with the insert device between them. The support apparatus and insert device are mounted between two companion flanges that are joined together with a set of companion flange bolts. The support apparatus may be configured to align an insert device positioned properly between the flange bolts. Additionally, the support apparatus may fit interchangeably within sets of flange bolts corresponding to different pressure rating and design standards, especially for pipes having the same nominal size. One exemplary support apparatus is disclosed in co-owned U.S. Pat. No. 4,751,938 ("the '938 patent"), the entire contents of which are incorporated herein by reference.

In practice, two support members often align with each other more precisely than two companion flanges. Thus, an insert device installed within the support apparatus may provide a better seal than if it were installed directly between two (potentially misaligned) companion flanges. In order to ensure that an insert device is properly aligned within the support apparatus, the support apparatus may be provided to an end user in a pre-assembled configuration. When pre-assembled, the support members are bolted together loosely with an insert device positioned properly between them. Thus, an end user need only install the pre-assembled apparatus between two companion flanges. The insert device in a pre-assembled configuration is sealed within the apparatus and pressurized system by the torque applied to the flange bolts.

A known support apparatus may be made of high-cost wetted materials. A high-cost material may be chosen because of its temperature stability, corrosive resistance capability, and magnetic permeability. Because of material expense, it may be desirable to reduce the amount of material used.

A support apparatus may also provide a better seal if provided to a user in a pre-torqued configuration. When pre-torqued, the assembly bolts of the support apparatus are provided with the optimal level of torque to seal the insert device within it. This optimal level of torque may be applied by a vendor or manufacturer, or by the user before mounting the support apparatus and insert device to an application. When the pre-torqued support apparatus is then installed between two companion flanges of a pressurized system, the insert device's seal is substantially independent of the torque levels applied to the flange bolts. Thus to get an optimal seal, an end user need not possess the skills or expertise to apply a precise torque level to the flange bolts.

Known support apparatus lack the feature of keeping the support apparatus's assembly bolts visible or adjustable after installation. One example of a support apparatus includes assembly bolts that extend vertically through one support member and into another, through a set of through-holes. These through-holes may be countersunk, counter-bored, or provided with any other recess (machined or otherwise) which obscures the assembly bolts. As illustrated in FIG. 3 of the '938 patent, the support members may sit substantially flush with each other. This configuration prevents a user from viewing the threaded portion of any assembly bolts between the support members. Thus, a user cannot verify the presence of assembly bolts within an installed support assembly, when such verification might indicate that the support assembly was installed correctly. Also as illustrated in FIG. 3 of the '938 patent, the companion flange members may completely cover the top and bottom surfaces of the support assembly, thereby preventing a user from seeing or accessing the assembly bolts' heads. Thus a user can neither verify the presence of assembly bolts, nor verify or adjust the level of torque applied to the assembly bolts.

A known support apparatus may also present challenges when removing the support apparatus from between companion flanges of a system. For example, the companion flanges cannot easily or safely be moved in a fixed-piping system, or where the piping is heavy as a result of nominal diameter and/or length. Thus, there is a need for a support apparatus that does not require the removal of all companion flange bolts to remove and/or install a support apparatus.

An additional feature missing from a known support apparatus is durability and versatility when used in corrosive or other harsh environments. Often the contents of a pressurized system exhibit very reactive properties and tend to corrode or erode components of the system. The inner bore of an inlet support member may frequently make contact with these contents, which may tend to erode or degrade the inlet support member. To use an inlet support member in such a harsh environment, it must be made of expensive corrosion- and/or heat-resistant material. Additionally, the inlet support member may require frequent replacement as it becomes corroded or eroded.

Another example of known support apparatus may provide a seal to an insert device through the use of a bite seal. A bite seal includes a ridged portion configured to cut or "bite" into an insert device when the components of a support assembly are pressed together. A bite seal is more effective than a seal depending solely on the pressure applied to an insert device. A known support apparatus provides a bite seal as an integral part of one of the support members. This configuration suffers from numerous disadvantages. First, in some support apparatus, the bite seal must be made of very hard and very expensive materials. When the bite seal is integral with a support member, the entire support member must be made out of the very hard and very expensive material, which increases material cost of the support apparatus. Additionally, a bite seal may suffer from damage through shipment, installation, or repeated use. Such damage may take the form of dents or dings. A damaged bite seal provides an inferior seal with an insert device; therefore, a damaged bite seal should be replaced. In known apparatus, to replace the bite seal requires replacing the entire support member, which increases the cost of maintaining the support apparatus.

In light of the foregoing, there is a need for a support apparatus or safety head assembly that may reduce the use of materials, while retaining or improving upon the functionality of a known support apparatus or safety head assembly. There is also a need for a support apparatus or safety head assembly that facilitates proper alignment and sealing of an insert device within a pressurized system. There is also a need for a safety head assembly that allows assembly bolts to be seen and adjusted while the safety head assembly is installed within a pressurized system. Additionally, there is a need for a safety head assembly having increased resistance to erosion or corrosion at decreased material cost. There is also a need for a safety head assembly having a bite seal that can be replaced at low cost. Further, there is a need for a method of installing and adjusting a safety head assembly that provides improved alignment and sealing.

BRIEF DESCRIPTION OF THE DRAWINGS

The accompanying drawings, which are incorporated in and constitute a part of this specification, illustrate several embodiments and together with the description, serve to explain the aspects of the disclosure.

FIG. 2B is a side view illustrating a profile of a safety head assembly according to the present disclosure.

FIG. 2C is a side view illustrating a profile of a known safety head assembly.

FIGS. 2D and 2E depict a safety head according to the present disclosure, overlaid on a profile of a known safety head to illustrate the material savings achieved by a safety head according to the present disclosure;

DESCRIPTION OF THE EMBODIMENTS

Reference will now be made in detail to the present exemplary embodiments, examples of which are illustrated in the accompanying drawings.

Figure 1:
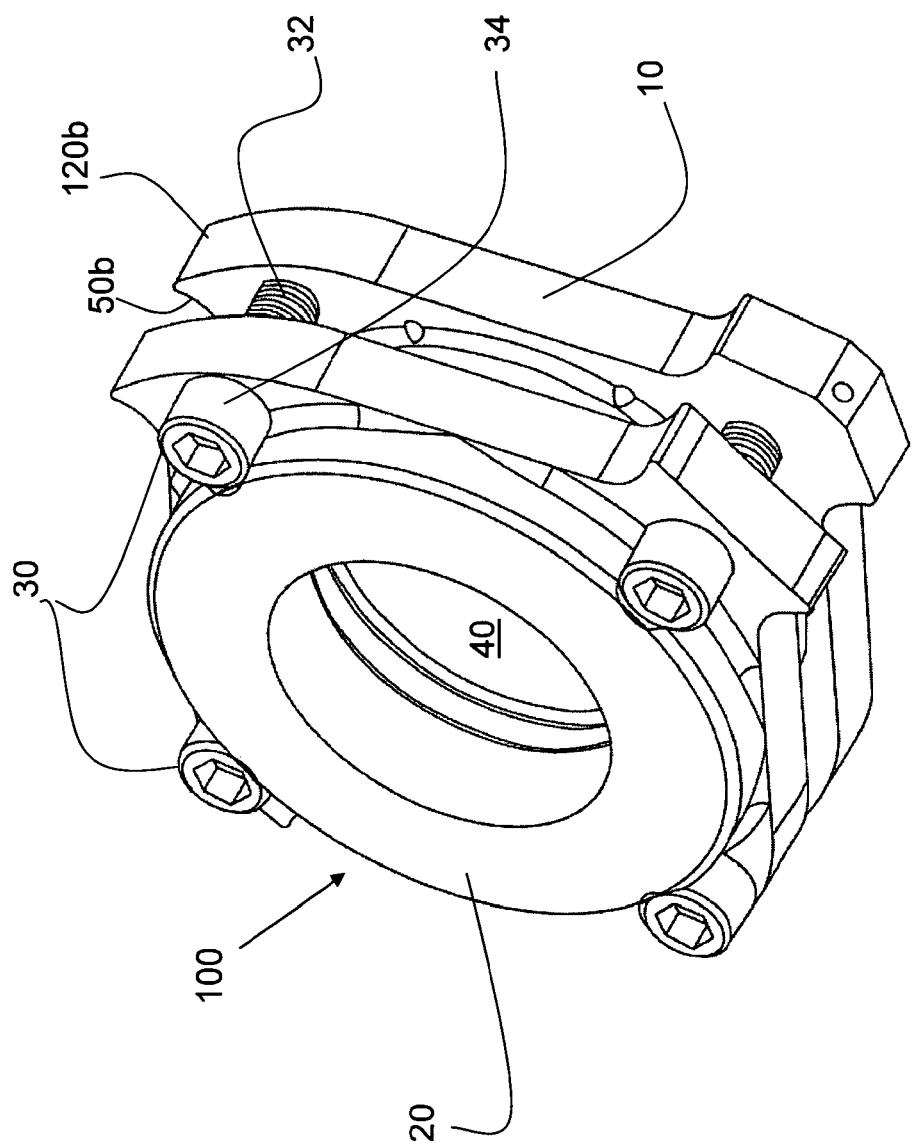
FIG. 1 is an isometric view illustrating an embodiment of a safety head assembly as set forth in the disclosure.

FIG. 1 depicts an exemplary safety head assembly in accordance with the present disclosure, generally represented by number 100. The example of FIG. 1 shows the safety head assembly 100 including an inlet safety head 10 and an outlet safety head 20. The safety head assembly 100 may act as a holder or support apparatus for any number of insert devices for placement within a pressurized fluid system. The safety head assembly 100 is installed into the pressurized system by being compressed between an inlet pipe flange and an outlet pipe flange (not shown). Additional sealing membranes (e.g., gaskets) may or may not be placed between the inlet pipe flange and the safety head assembly, and/or between the safety head assembly and the outlet pipe flange. This compression is achieved by applying torque to flange bolts (depicted generally as 200 in FIGS. 4A-4C, 201-204 in FIGS. 5A-5B, and 211-218 in FIGS. 6A-6B).

In one embodiment, a safety head assembly 100 and/or safety heads 10, 20 may be configured to retain backwards compatibility with insert devices used with prior known safety heads and safety head assemblies. For example, a safety head assembly 100 and/or safety heads 10, 20 may be fully compatible with existing rupture disks that can be installed in current safety head assemblies commercially offered by BS&B Safety Systems. Additionally or alternatively, a safety head assembly 100 and/or safety heads 10, 20 may be configured to retain backwards compatibility with systems in which prior known safety heads and safety head assemblies are used. In this way, a safety head assembly according to the present disclosure may be substituted for a prior known safety head assembly without requiring additional modifications to the existing system.

The safety head assembly 100 as depicted in FIG. 1 may be assembled by the use of assembly bolts 30 that secure the inlet safety head 10 to the outlet safety head 20. As shown in FIG. 1, a rupture disk 40 is held between the safety heads 10, 20; however, the disclosure comprehends any number of suitable insert devices held between the safety heads 10, 20. It is also contemplated that multiple insert devices may be held between the safety heads 10, 20 in a single installation. The safety head assembly 100 as depicted in FIG. 1 may either be pre-torqued or pre-assembled, as explained below. Alternatively, the various components may be provided separately.

If the safety head assembly 100 is pre-assembled, for example, the safety heads 10, 20 may be held together without sealingly engaging the rupture disk 40 between them. When safety head assembly 100 is provided in this pre-assembled configuration, an end user is responsible for creating the sealing engagement of the rupture disk 40. This sealing engagement may be provided either by applying torque to the assembly bolts 30 or by compressing the safety head assembly 100 between two flanges of a pressurized system.

Alternatively, if the safety head assembly 100 is pre-torqued, for example, the safety head assembly 100 may be provided to the customer with the rupture disk 40 already sealingly engaged between the safety heads 10, 20. Thus, a manufacturer, vendor, or end user may apply the optimal amount of torque to assembly bolts 30, eliminating the need for an end user to create sealing engagement between the insert device (e.g., rupture disk) and the safety head through the companion flange bolting arrangement. By providing a pre-torqued assembly, a manufacturer or vendor may therefore deliver a safety head assembly 100 already having an optimal sealing engagement with an insert device. By using a pre-torqued assembly, an end user may therefore apply a safety head assembly 100 already having an optimal sealing engagement with an insert device.

Figure 2A:
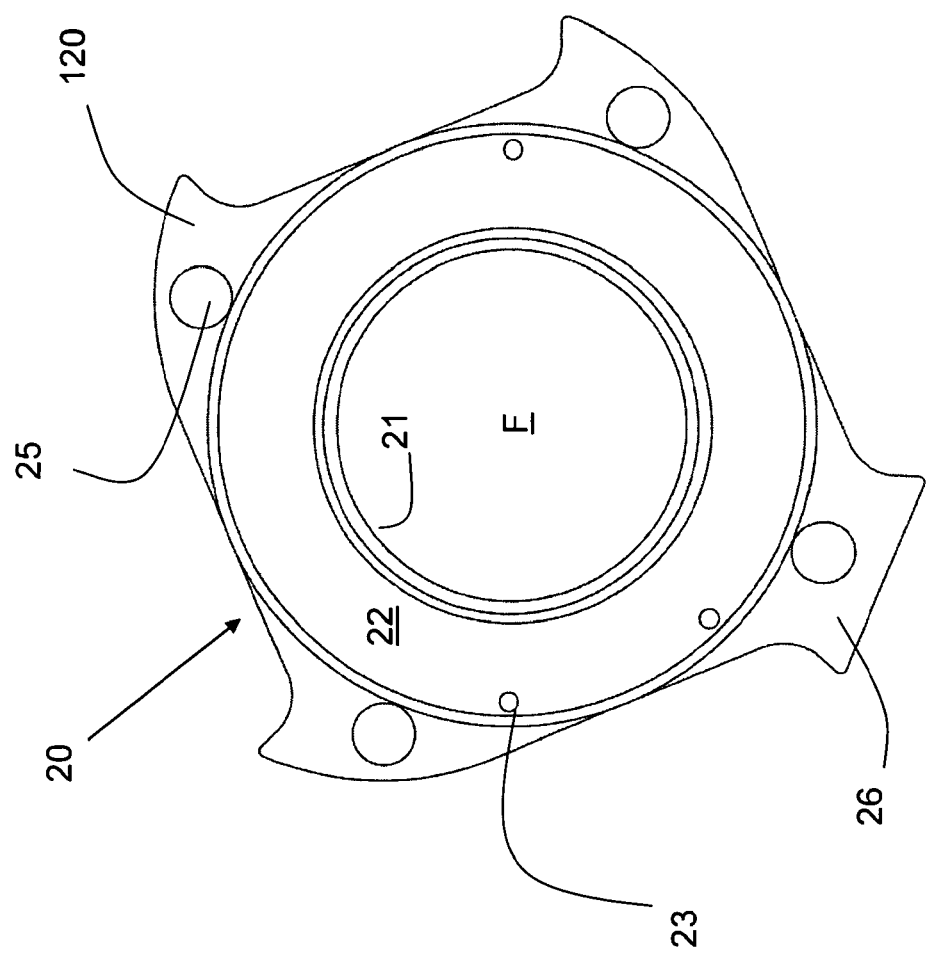
FIG. 2A is a plan view illustrating an outlet safety head for use in the embodiment of FIG. 1.

The outlet safety head 20 as illustrated in the assembly of FIG. 1 is shown separately in FIG. 2A. As illustrated in FIG. 2A, the outlet safety head 20 may include a flange 22, which may be circular, and projections. The projections may be waves (designated generally as 120) and/or a handle 26. The projections may extend outwards from the safety head 120, and may be positioned around 90-degrees apart about the perimeter of the safety head. A straight edge 24 may run between each projection. In an embodiment wherein the flange 22 is circular, the straight edge 24 may run tangentially to the circle. An outlet bore 21 at the center of the outlet safety head 20 may define a fluid flow path F. Waves 102 and handle 26 each include a through-bore that defines a bolt through-hole 25. The flange includes a series of asymmetrical partial bores that define pin holes 23. The configuration of the pin holes 23 facilitates proper alignment of the outlet safety head 20 with the inlet safety head 10 and/or with the insert device(s) 40, as will be described in detail later.

A straight edge 24 may provide advantages during handling and clamping of the safety head 20 and/or safety head assembly. For example, a straight edge may allow for secure clamping in a vice (two or more clamping surfaces), which may be desired for pre-assembly of a safety head assembly. If it is desirable to apply a pre-assembly torque to an assembly bolt (30, as illustrated in FIG. 1), then secure clamping may facilitate that process. In one embodiment, the edges of the safety head may be rounded for ergonomic handling of the safety head.

The safety head of FIG. 2A provides the feature of projections (waves 120 and handle 26) having smaller material thickness than that of a flange 22, as best shown in FIG. 1. Providing waves 120 with smaller material thickness reduces the weight and material cost of the safety head assembly 100. The material thickness savings are illustrated, for example, in FIG. 2B, which shows the material savings of an inlet safety head (210B) and outlet safety head (220B) of the present disclosure as compared to the prior art inlet safety head (210C) and prior art outlet safety head (220C) illustrated in FIG. 2C. The material thickness savings are also illustrated, for example, in FIGS. 2D and 2E, in which a safety head according to the present disclosure (10A) is superimposed on the profile of a prior known safety head (10Z).

Reducing the material thickness of projections of a safety head may result in cost savings in both material and machining. For example, by reducing the thickness of the projections, the required length of bolt hole may also be reduced—especially when the safety head is formed by casting. As a result, the time and cost required to machine each safety head may be reduced. The resulting reduction in material thickness also may reduce the overall mass of the safety head assembly, further improving the ergonomics and handling characteristics of a safety head assembly.

It has been discovered that a safety head assembly according to the present disclosure may save up to 30%-40% material and up to 10%-35% cost as compared to known assemblies and devices. It has also been discovered that bigger material and costs savings are possible with safety head assemblies of a bigger nominal size. The material savings were made possible by the discovery that a proper seal may be provided within a safety head assembly using thinner projections and with fewer engaged screw threads than had been required by prior known safety heads and safety head assemblies.

A reduced-thickness projection (wave 120 and handle 26) may facilitate the use of an externally placed sensor. In a known support assembly, without reduced thicknesses, the inlet and outlet safety heads obstruct access to the flange and insert device between the two safety heads (as illustrated, for example, in FIG. 2C). In a safety head assembly according to the present disclosure, the inlet and outlet safety heads allow for access between the two safety heads (as illustrated, for example, in FIG. 2B). The access afforded by the disclosed safety head assembly may facilitate the use of, for example, a proximity-type sensor. Proximity type sensing may interface across a thin wall in the safety head at a specific point aligning with the rupture disk. Because of the space between the inlet safety head and outlet safety head of the present disclosure, proper placement of a proximity sensor is possible. Although a proximity sensor is described, other sensors may be used in addition or alternatively to a proximity sensor. For example, a temperature sensor or a pressure sensor may be used. In one embodiment, a sensor may be used with a blind hole or a through hole provided in a safety head or other component of a safety head assembly. A sensor may be installed in the inlet and/or the outlet of a safety head assembly. A sensor may be installed in the inlet safety head and/or the outlet safety head. A single sensor, or multiple sensors, may be used at any given time in a single installation.

A reduced-thickness wave 120 and/or handle 26 may provide the added advantage of leaving at least one assembly bolt 30 visible and/or accessible when the safety head assembly 100 is installed within a pressurized system. After installation of a known safety head assembly, an operator cannot view or access the assembly bolts. In such known systems, it may be difficult or impossible to verify that the assembly bolts are actually and properly installed, creating safety concerns. Additionally, in a known safety head assembly, an operator may be unable to determine whether the assembly bolts are corroded and need replacing. According to the safety head assembly 100 of FIG. 1, by contrast, both the assembly bolt threading 32 and the assembly bolt heads 34 may be visible after installation. Additionally, after installation the assembly bolt heads 34 may remain accessible to allow their torque levels to be checked or adjusted, or for corrosion levels to be checked. As discussed previously, the quality of the seal between safety heads 10, 20 and an insert device (such as the rupture disk 40) may depend on the torque levels of the assembly bolts 30. The improved visibility and accessibility of the assembly bolts may also allow for the integration of previously unused technology, such as integrated bolt strain monitors, tension meters, etc., that may allow for the monitoring and/or validation of torque values without requiring disassembly of the installation.

In one embodiment, a recess 27 (as illustrated in FIG. 1) may be provided in the safety head flange to accommodate a bolt head 34. In this way, a bolt 30 may be inserted so that the bolt head 34 does not extend above the surface of the flange of the safety head.

Figure 3:
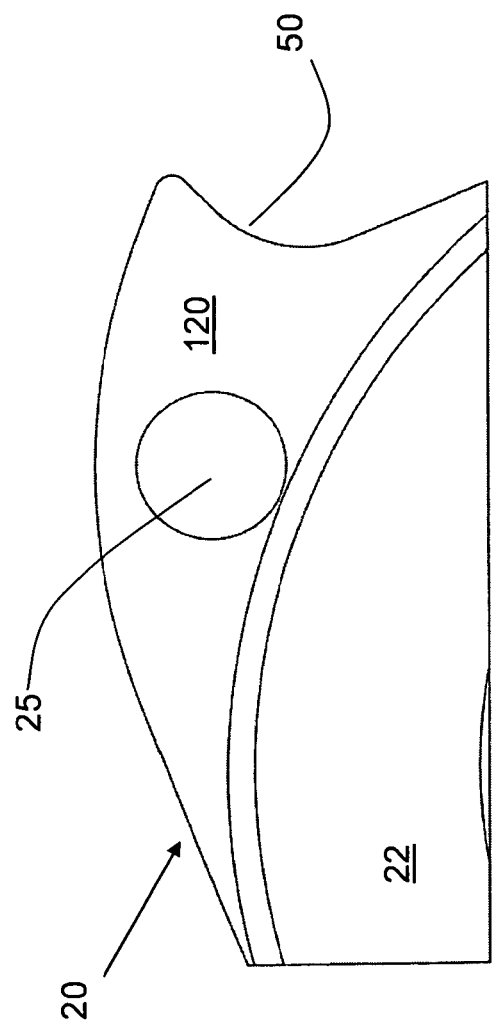
FIG. 3 is a detailed plan view of a wave of the outlet safety head of FIG. 2A.

One wave 120 of the safety head of FIG. 2A is shown in detail in FIG. 3. The wave face 50 exhibits a blended curvature that facilitates proper positioning of the safety head 20 and safety head assembly 100 within the pipe flange bolts (200, generally, in FIGS. 4A-4C) of a pressurized system. The wave face 50 further may be configured to facilitate interchangeable installation of a single size safety head 20 or safety head assembly 100 between a number of pipe flanges having different bolting patterns. The wave face 50 further may be configured to facilitate interchangeable installation of a single safety head 20 or safety head assembly 100 between a number of pipe flanges having different design pressure ratings, as illustrated in FIGS. 4A-4C.

Figure 4C:
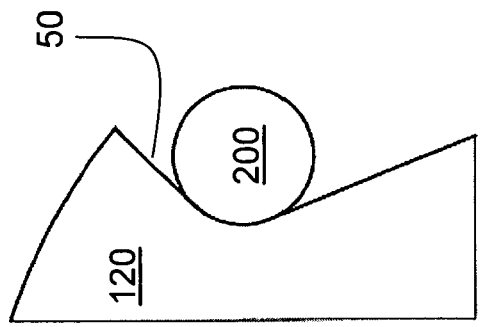
FIGS. 4A-4C are detailed plan views illustrating placement of a wave of the outlet safety head of FIG. 2A adjacent bolts from different bolting patterns.
Figure 4B:
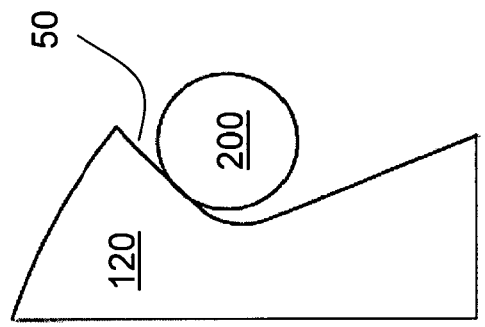
Figure 4A:
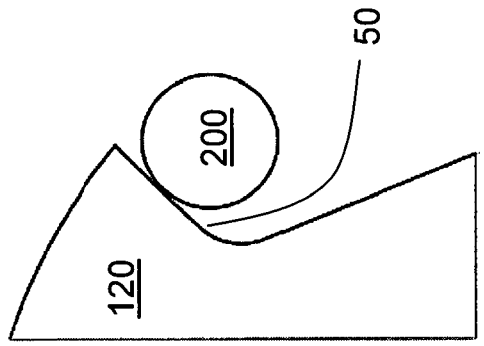
Figure 4D:
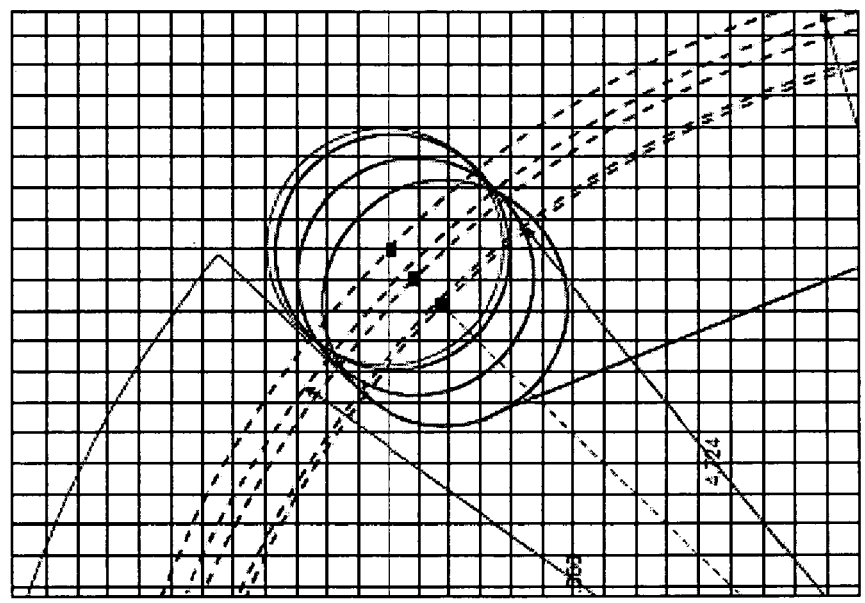
FIG. 4D is a depiction of the process for designing a blended curvature of a wave face according to the present disclosure.

As shown in FIGS. 4A through 4C, the wave face 50 may be configured to fit adjacent flange bolts 200 disposed in a variety of configurations or patterns. The wave 120 of the present disclosure may exhibit such a configuration through the use of the blended curvature of the wave face 50. It has been discovered that a blended curvature of wave face 50 may be obtained by superimposing multiple bolting patterns on top of one another (as illustrated in FIG. 4D) and manufacturing the wave face 50 to contact at least a portion of a bolt from each of the bolting patterns. As illustrated, each of FIGS. 4A and 4C shows a flange bolt 200 positioned at a different radius from the center of the pipe. Regardless of that radius, the wave face 50 may be positioned in contact with the flange bolt 200 and/or tangential to the surface of flange bolt 200. Accordingly, the same safety head 20 or safety head assembly 100 may fit a number of bolting patterns for a pipe of a particular nominal size. In one embodiment, the shape of the wave face 50 may ensure that at least one point of contact remains for each flange type/rating. A safety head according to the present disclosure may also be configured such that a single design per size can satisfy the pressure requirements for multiple pressure ratings. Thus, for example, a wave face 50 may be configured to fit two or more pipe flange type/ratings promulgated by the American National Standards Institute (e.g., ANSI 150/300/600), Deutsches Institut für Normung (e.g., DIN 10/16/25/40), and the Japanese Industrial Standards (e.g., JIS 16/20/30/40).

The face of the wave may also provide advantages in installation, as shown in FIGS. 5A-5B and 6A-6B. For purposes of the present description, flange bolts are referenced generally by the number 200. Specific flange bolts in FIGS. 5A-6B are referenced specifically by the numbers 201-204 and 211-218. Also for purposes of the present description, waves are referenced generally by the number 120, while specific waves are referenced by the numbers 121-123.

Figure 5B:
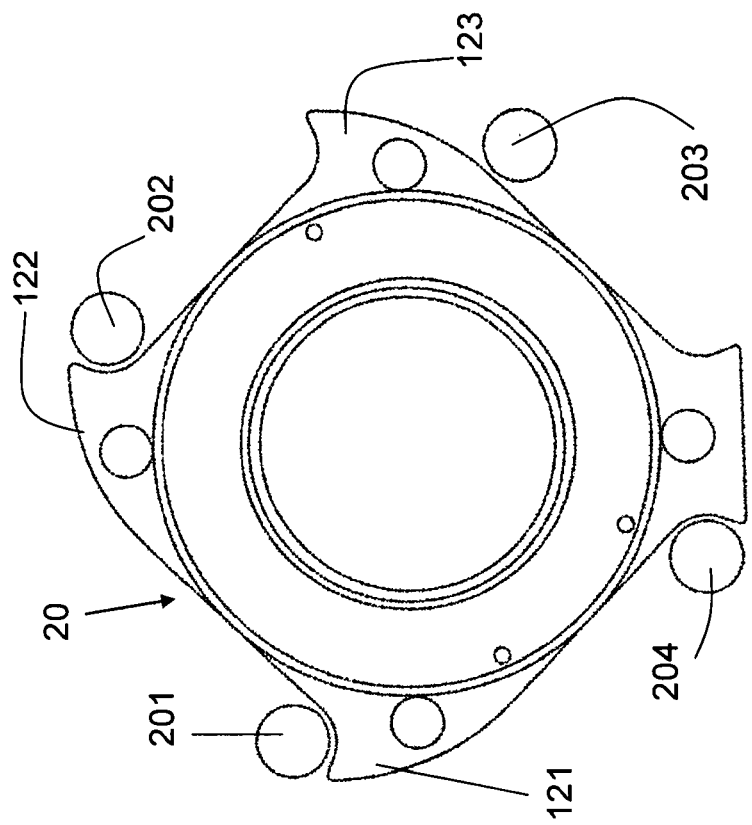
FIGS. 5A-5B are plan views illustrating first and second positions of the outlet safety head of FIG. 2A as installed in a four pipe flange bolt pressurized system.
Figure 5A:
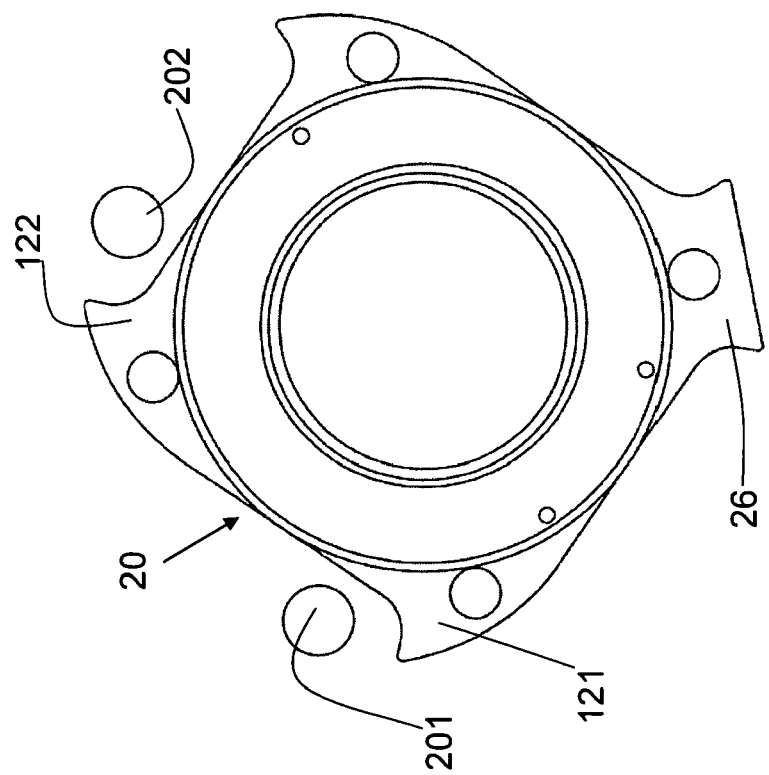

As shown in FIGS. 5A and 5B, the safety head 20 of FIG. 2A may be installed within a system using four pipe flange bolts 201-204. Only half of the flange bolts in the four-bolt flange system need to be removed before installation. As illustrated in FIG. 5A, two flange bolts have been removed leaving only flange bolts 201 and 202.

Once half of the flange bolts are removed, the safety head 20 may be inserted between the remaining flange bolts 201, 202. As shown in FIG. 5A, the safety head may be inserted so that one bolt 201 is positioned between the first wave 121 and second wave 122, and so that the second wave 122 is positioned between both flange bolts 201 and 202. If desired, the safety head 20 may be provided with asymmetry or a handle 26 to provide a visual cue to an operator about which wave (122) to place between the remaining flange bolts 201, 202.

After the safety head 20 has been positioned as illustrated in FIG. 5A, it may be rotated into the position illustrated in FIG. 5B. Rotating the safety head 20 brings the face of the first wave 121 into contact with bolt 201 and the face of the second wave 122 into contact with bolt 202. This contact serves to stabilize the safety head 20 in preparation for further installation steps. Additionally, this contact and the blended radii of the wave faces serve to center the safety head 20. When the safety head 20 is used to install a rupture disk 40, for example, it is desirable for the rupture disk 40 to be as close to centered within the pressurized system as possible.

With safety head in the position illustrated in FIG. 5B, the previously removed flange bolts 203, 204 may be reinserted. In the illustrated embodiment, the safety head is configured so that the replaced flange bolts 203, 204 each contact a surface of the safety head. The result—four contact points on the safety head corresponding to each of the four flange bolts—provides desirable stability and centering of both the safety head 20 and whatever insert may be held within the safety head assembly 100.

Figure 6B:
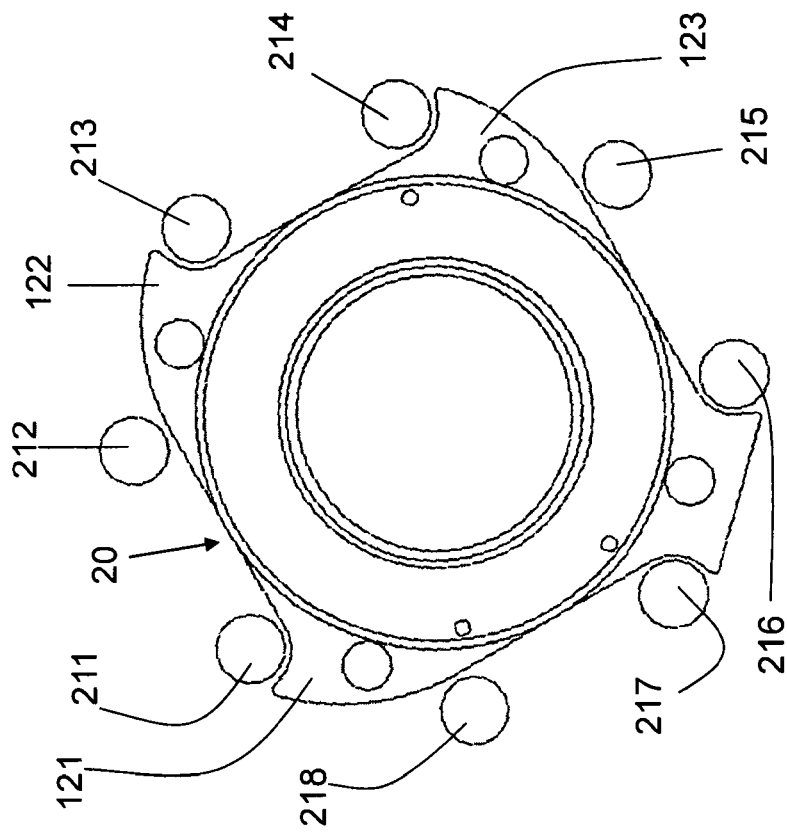
FIGS. 6A-6B are plan views illustrating first and second positions of the outlet safety head of FIG. 2A as installed in an eight pipe flange bolt pressurized system.
Figure 6A:
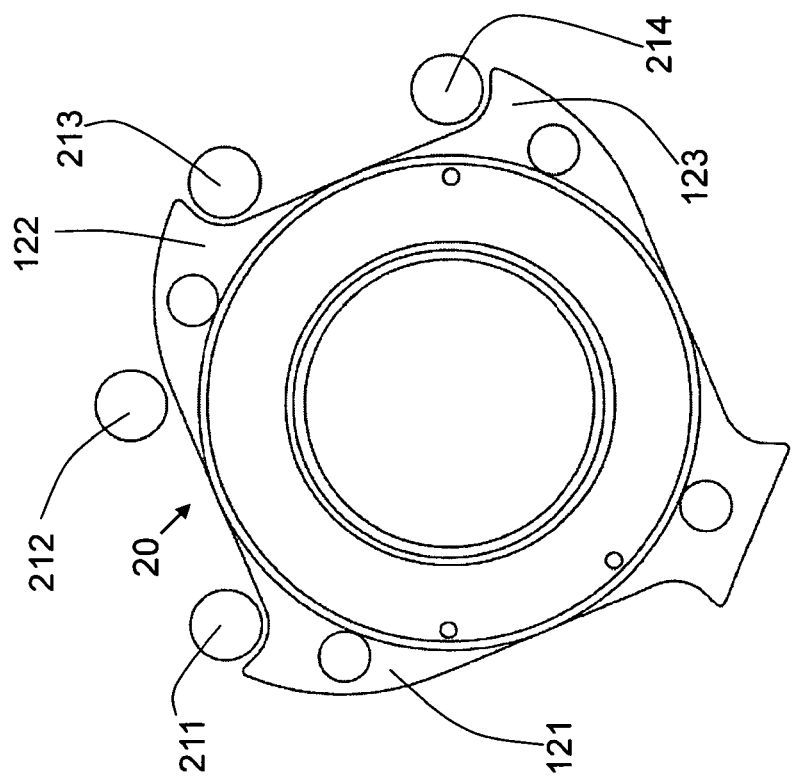

The safety head 20 of FIG. 2A also may be installed into a system using eight pipe flange bolts 211-218, as illustrated in FIGS. 6A and 6B. As illustrated in FIG. 6A, the safety head 20 may be installed into an eight-bolt system after removal of only half of the eight flange bolts. In FIG. 6A, four flange bolts have been removed, leaving only flange bolts 211-214.

Once half of the flange bolts are removed, the safety head 20 may be inserted among the remaining flange bolts 211-214. FIG. 6A demonstrates a safety head 20 inserted with two flange bolts 213, 214 between the second wave 122 and a third wave 123. Also as illustrated, the safety head 20 is inserted with the other two flange bolts 211, 212 between the first wave 121 and second wave 122. According to the embodiment illustrated in FIG. 6A, the second and third waves 122 and 123 may be configured with their faces facing one another. Such a configuration may facilitate proper alignment of the safety head 20 within the pressurized system by constraining lateral movement and/or rotation of the safety head 20 after installation.

After the safety head 20 has been properly placed into the system, the previously removed flange bolts 215-218 may be reinserted as illustrated in FIG. 6B. As illustrated, the safety head 20 is configured so that the replaced flange bolts 215-218 each contact a surface of the safety head 20. This feature may provide desired stability and centering of the safety head 20 within the pressurized system.

Again, although each of FIGS. 2-6B illustrates only a single safety head—specifically an outlet safety head 20—any or all of the same features can be provided in an inlet safety head 10 or a safety head assembly 100 according to the present disclosure. For example, the inlet safety head 10, best shown in FIG. 1, may exhibit a substantially similar profile as the outlet safety head 20. As shown in FIG. 1, the inlet safety head 10 exhibits waves 120*b* and faces 50*b* parallel to those of the outlet safety head 20. Thus the inlet safety head 10 may be used or installed in substantially the same way as the outlet safety head 20. Furthermore, the inlet safety head 10 and outlet safety head 20, as assembled according to the example of FIG. 1, may offer the same or similar features as a unit that the inlet safety head 10 and outlet safety head 20 offer individually. Specifically, the safety head assembly 100 offers waves 120, 120*b* and faces 50, 50*b* that facilitate placement and alignment of the safety head assembly 100 within a pressurized system.

Figure 7:
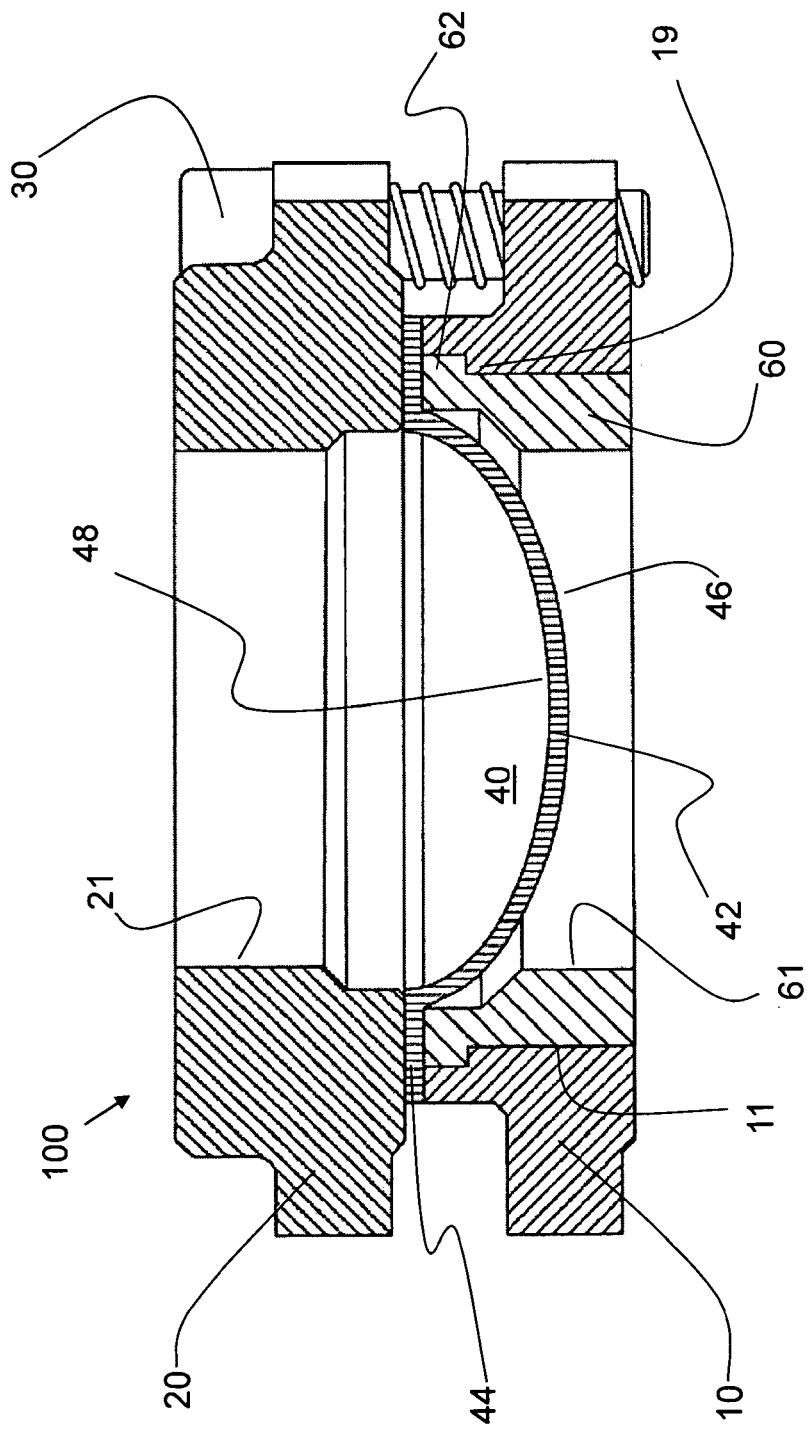
FIG. 7 is a cross-sectional view illustrating the safety head assembly of FIG. 1, including a reverse-buckling rupture disk and a safety head insert member.

Turning now to the safety head assembly 100 as illustrated in cross-section in FIG. 7, an insert device may be held or supported within the safety head assembly 100. Although FIG. 7 illustrates the rupture disk 40 as a reverse-buckling rupture disk, the disclosure comprehends any number of suitable insert devices being used with the safety head assembly 100, regardless of their shape (e.g., flat or domed), mode of operation (e.g., reverse buckling or tension loaded), or function (e.g., pressure release, pressure relief, sensing, or monitoring). As shown, the outlet safety head 20 aligns with the inlet safety head 10, with the rupture disk 40 placed between them. Assembly bolts 30, only one of which being illustrated in FIG. 7, keep the two safety heads 10, 20 in position.

The rupture disk 40 illustrated in FIG. 7 is provided with a rupturable portion 42 and a flange portion 44. The flange portion 44 seals between the inlet safety head 10 and outlet safety head 20. As discussed; the rupture disk 40 is a reverse-buckling rupture disk. Thus, the rupturable portion 42 is positioned with a convex surface 46 aligned with the inlet bore 11 of the inlet safety head 10 and a concave surface 48 aligned with the outlet bore 21 of the outlet safety head 20. The alignment of the rupture disk with both the inlet 10 and the outlet 20 of the safety head assembly 100 and the subsequent alignment of the safety head assembly 100 within the companion flanges may maximize the exposure of the rupturable portion 42 of the rupture disk 40 to the fluid flow. Although a reverse-buckling rupture disk 40 is shown, the safety head assembly 100 may be used with any suitable insert device, including rupture disks 40 that are flat or forward-buckling.

A safety head assembly 100 may also include a safety head insert member 60, as shown in FIG. 7. The insert member has an inner bore 61 defining a fluid flow path. The illustrated safety head insert member 60 fits within the inner bore 11 of the inlet safety head 10, with a flange 62 of the safety head insert member 60 resting on a flange support area 19 of the inlet safety head 10. The safety head insert member 60 may be made of a durable or corrosion-resistant material, thereby providing additional durability or corrosion resistance to the inlet safety head 10 and safety head assembly 100. In one example, the safety head insert member 60 may be made of a noble metal, inert material, or any suitable non-reactive material. The safety head insert member 60 may be made of a plastic or composite material, or out of a ceramic material. By making only the safety head insert member 60 out of expensive corrosion-resistant material (such as Hastelloy), while making the safety head 10 out of a more standard material (such as, for example, 316 stainless steel) the cost of the inlet safety head 10 may be reduced by limiting the amount of expensive material used. In another embodiment, by making the safety head insert member 60 replaceable, the insert may be precision-machined without having to precision machine the entire safety head body. In this way, the insert may be precision-machined to achieve a desired flow condition. Additionally, when the insert member 60 becomes corroded or eroded, an end user can replace or repair only the safety head insert member 60, allowing the inlet safety head 10 to be reused without being replaced or repaired. Although the insert illustrated in FIGS. 7 and 8 is shown on the inlet side of the safety head assembly, the present disclosure also contemplates that a safety head insert may be provided additionally or alternatively on the outlet side of the safety head assembly.

Figure 8:
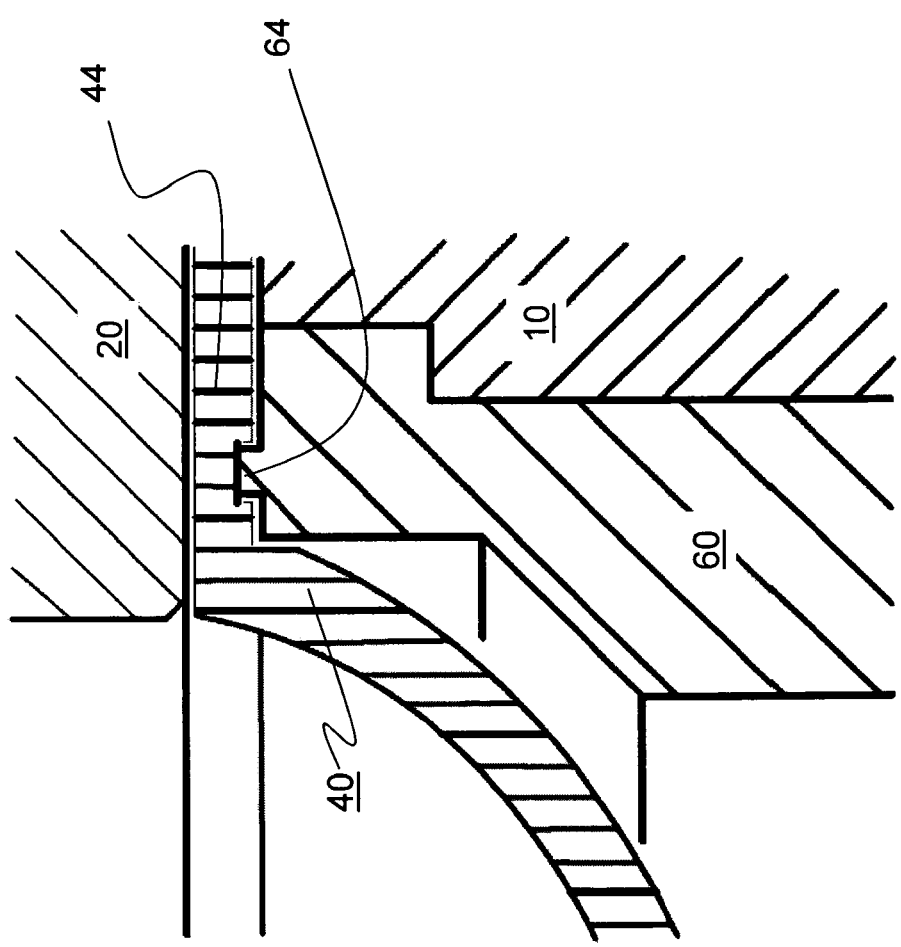
FIG. 8 is a detailed cross-sectional view illustrating the safety head assembly of FIG. 1, demonstrating the bite seal of a safety head insert member.

As illustrated in FIG. 8, the safety head insert member 60 may also include a bite seal 64 configured to engage an insert device such as the rupture disk 40. The bite seal 64, which may be made of a hard metal or other material, will dig or "bite" into the flange portion 44 of the rupture disk 40 when pressed against it. By biting into the insert device, a bite seal 64 may create a more effective seal than a simple pressure seal. Additionally or alternatively, a bite seal may be added to a safety head insert member on the outlet side. In one embodiment, a bite seal may be provided by each of the inlet and outlet inserts, creating, in effect, a double-bite seal. In such an embodiment, the bite seals of the inlet and outlet inserts may be aligned or offset from one another.

Including the bite seal 64 in the safety head insert member 60 rather than the inlet safety head 10 itself offers several advantages. The hard material used in a bite seal 64 may be quite expensive. By making the safety head insert member 60 out of such a hard material, the inlet safety head 10 may be made of a softer cheaper material. Additionally, a bite seal 64 may become damaged during shipment, installation, or use. A damaged bite seal 64 may provide an inferior seal with an insert device; therefore, it may be desirable to replace the damaged bite seal 64. When the bite seal 64 is provided by the safety head insert member 60, an end user can replace only the safety head insert member 60, allowing the inlet safety head 10 to be reused.

Although a bite seal 64 is described, it is also contemplated that an insert member 60 may be provided with any other suitable mechanism for creating or improving a seal. For example, an insert may be provided with a spiral serration face or faces. As another example, an insert may be provided with one or more O-rings.

Figure 9:
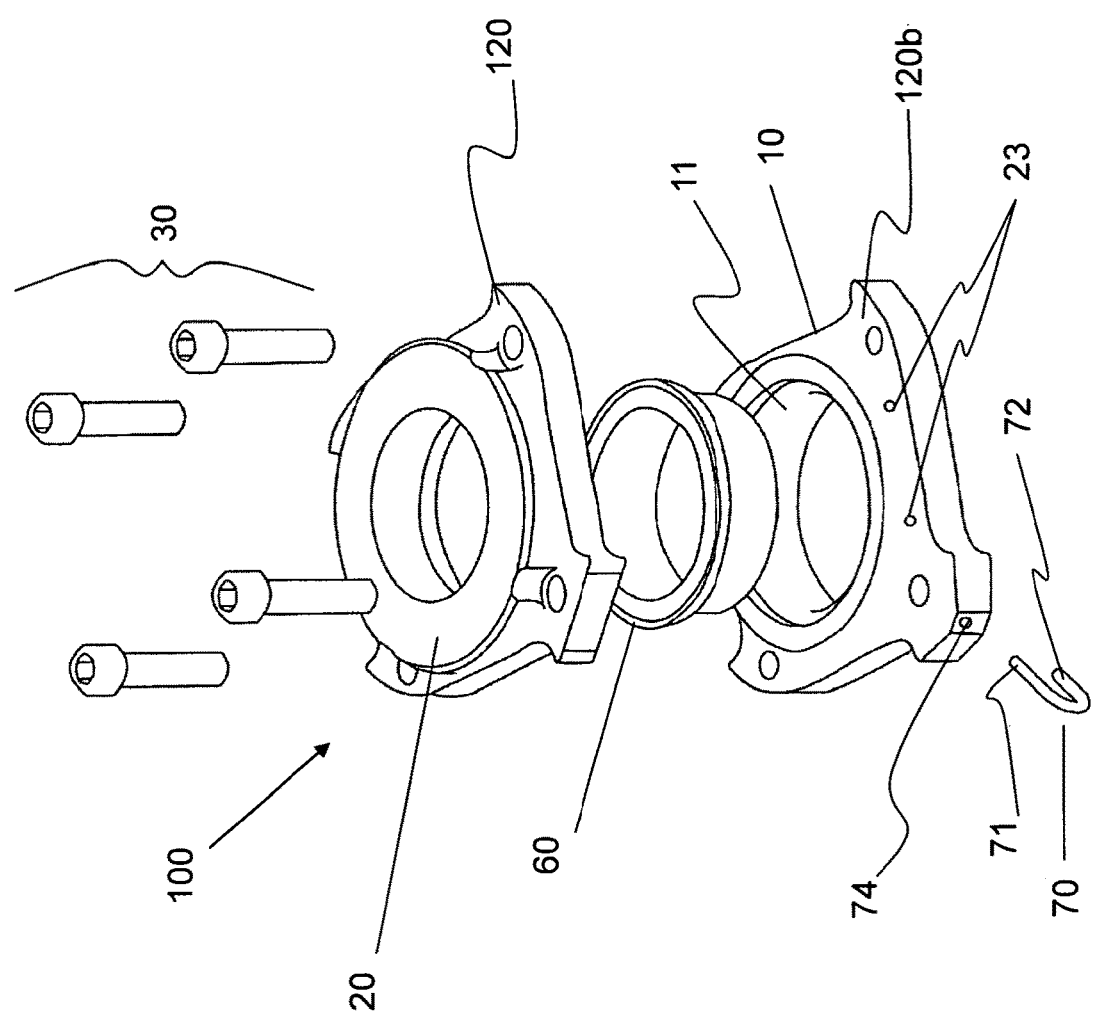
FIG. 9 is an exploded isometric view of the safety head assembly of FIG. 1, including a safety head insert member.

FIG. 9 illustrates an exploded view of a safety head assembly 100 including the safety head insert member 60. For clarity, no insert device is shown; however, in use, an insert device, such as the rupture disk 40, may be provided between the outlet safety head 20 and safety head insert member 60 and/or inlet safety head 10. As shown, the safety head insert member 60 fits within the inner bore 11 of the inlet safety head 10. The outlet safety head 20 is positioned on top of the inlet safety head 10. The waves 120 of the outlet safety head 20 are positioned with their wave faces aligned with the wave 120b faces of the inlet safety head 10. Assembly bolts 30 may be used to hold the two safety heads 10, 20 together, either in a pre-assembled or pre-torqued configuration. A J-bolt 70, in cooperation with a J-bolt hole 74, may serve to keep the inlet safety head 10 in place adjacent to a pipe flange (not shown) in a pressurized system. A J-bolt 70 may also serve as an indicator for process flow direction. A first end 71 of the J-bolt 70 may fit into the J-bolt hole 74 of the inlet safety head 10, while a second end 72 of the J-bolt 70 may fit into a J-bolt hole (not shown) of an inlet pipe flange (also not shown).

Figure 10:
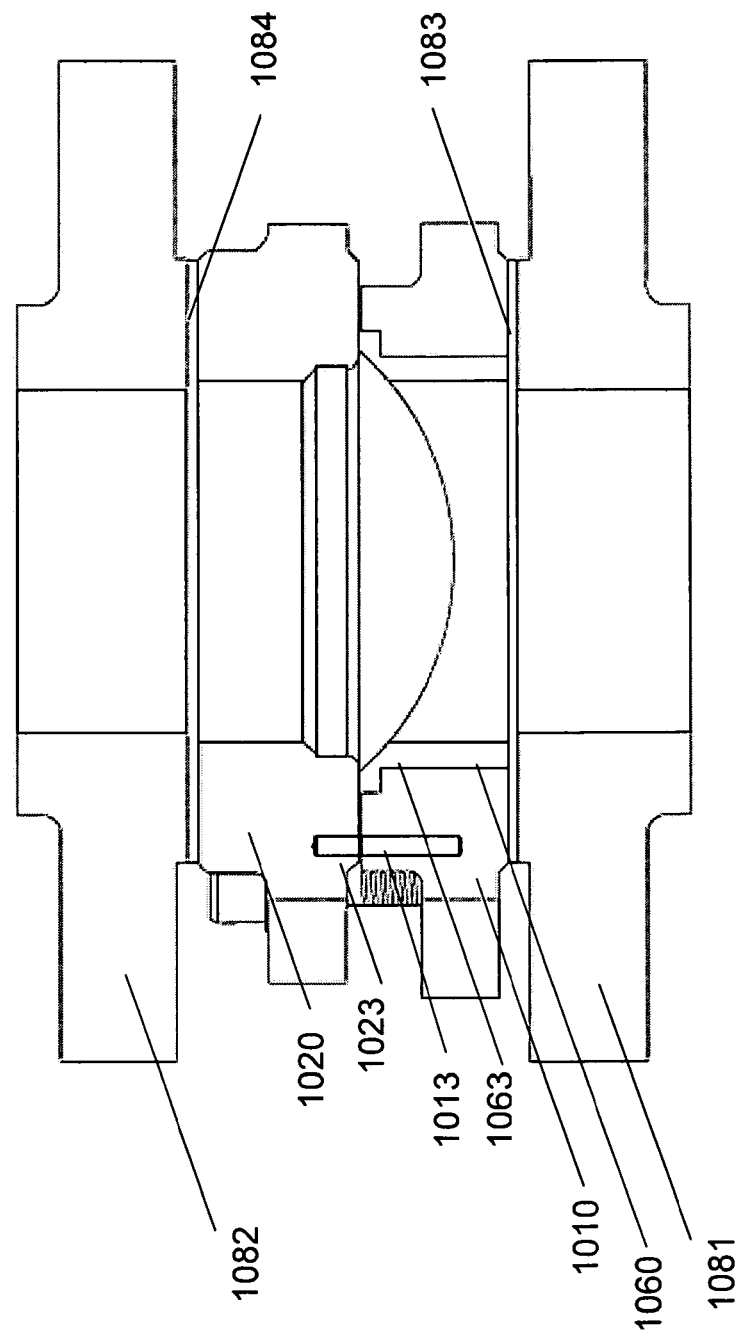
FIG. 10 is a cross-sectional view of a safety head assembly including an inlet safety head with a safety head insert.

One embodiment of a safety head insert in an inlet safety head is depicted in FIG. 10. As illustrated, a safety head assembly comprising an inlet safety head 1010 and an outlet safety head 1020 is installed between an inlet pipe flange 1081 and an outlet pipe flange 1082. An inlet safety head pin hole 1013 and an outlet safety pin hole 1023 are illustrated (without a pin). In FIG. 10, the inlet safety head insert 1060 includes an approximately 45-degree taper on the inner portion of its shoulder 1063. The 45-degree taper may create a thin region in the safety head insert 1060 at the insert's shoulder. It may be desirable to lower the safety head insert's shoulder 1063 to eliminate or thicken the thin region.

Figure 12:
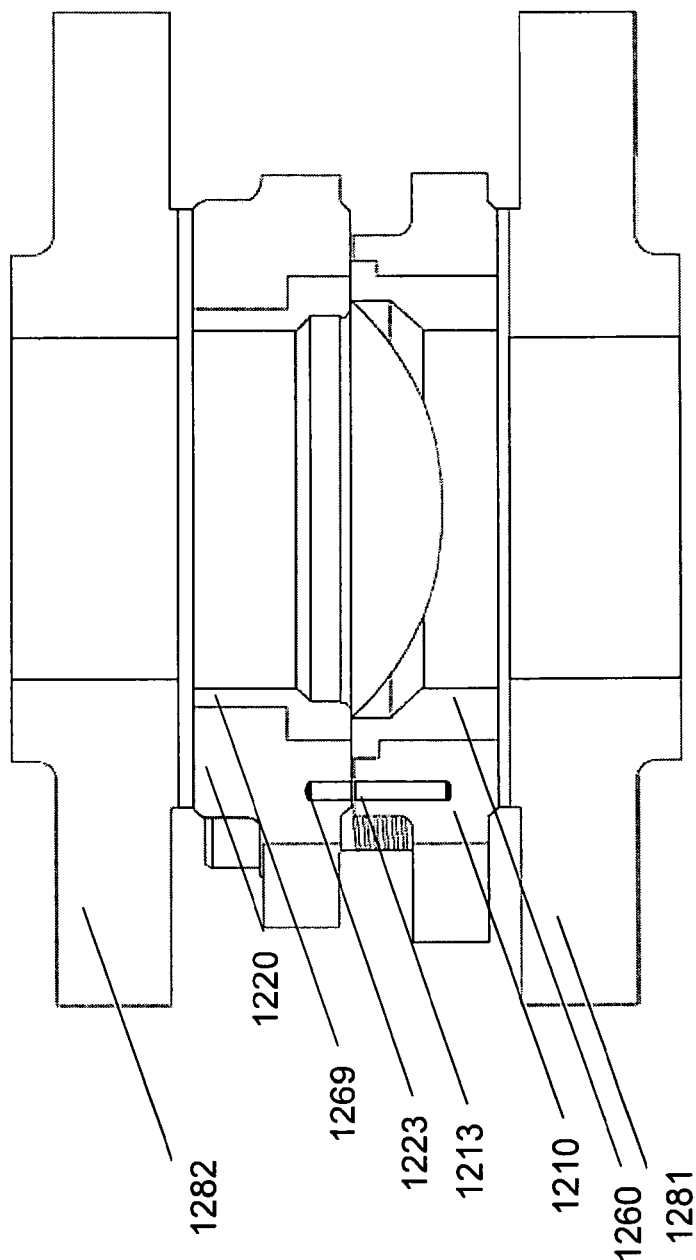
FIG. 12 is a cross-sectional view of another embodiment of a safety head assembly including an inlet safety head with a safety head insert and an outlet safety head with a safety head insert.
Figure 13:
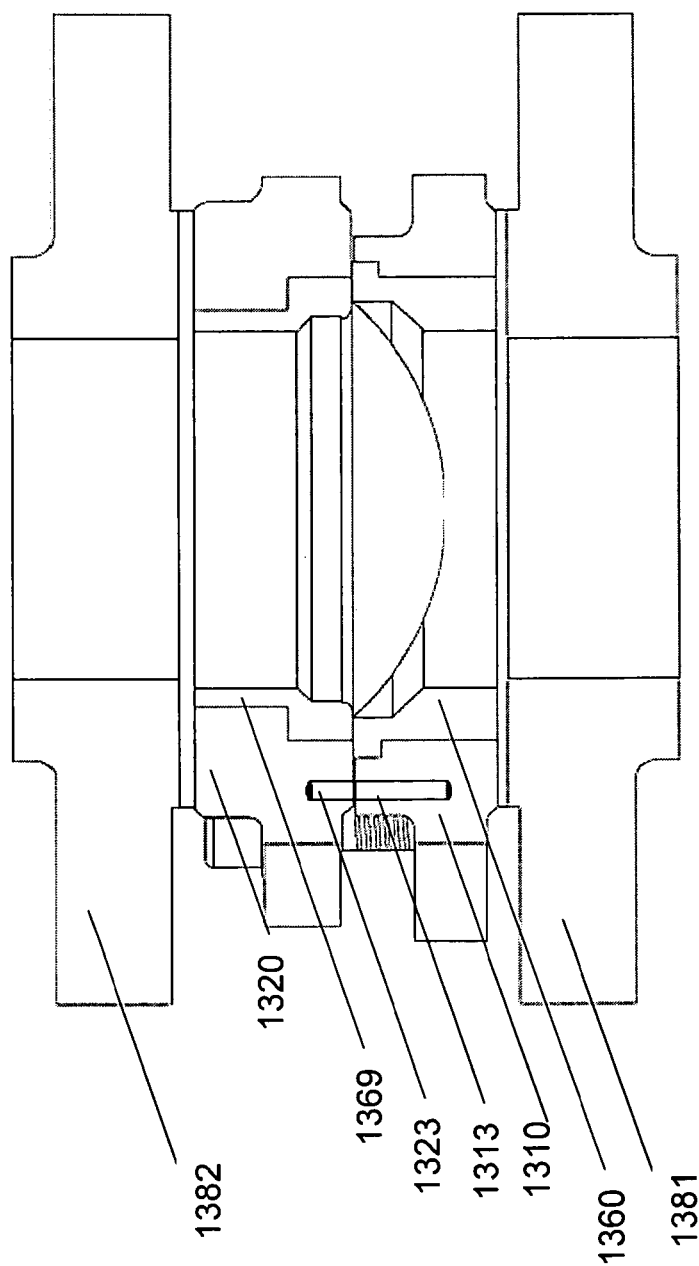
FIG. 13 is a cross-sectional view of yet another embodiment of a safety head assembly including an inlet safety head with a safety head insert and an outlet safety head with a safety head insert.

Another embodiment of a safety head insert in an inlet safety head is depicted in FIGS. 12 and 13. In FIG. 12, an inlet safety head 1210 and outlet safety head 1220 are installed between mated flanges 1281 and 1282. Pin holes 1213 and 1223 are also illustrated (without a pin). An inlet safety head insert 1260 and an outlet safety head insert 1269 are shown. In FIG. 13, an inlet safety head 1310 and outlet safety head 1320 are installed between mated flanges 1381 and 1382. Pin holes 1313 and 1323 are also illustrated (without a pin). An inlet safety head insert 1360 and an outlet safety head insert 1369 are shown.

The inlet safety head insert 1260 depicted in FIG. 12 may use approximately 94% more material than the inlet safety head insert 1060 depicted in FIG. 10, while the inlet safety head insert 1360 depicted in FIG. 13 may use approximately 25.2% more material than the inlet safety head insert 1060 depicted in FIG. 10. The assembly depicted in FIG. 13 may match the current geometry of a known safety head assembly. Thus, the present disclosure contemplates that safety head inserts of different sizes may be used to provide different features, to save material, and/or to match the internal geometry of an existing or known safety head.

Figure 11:
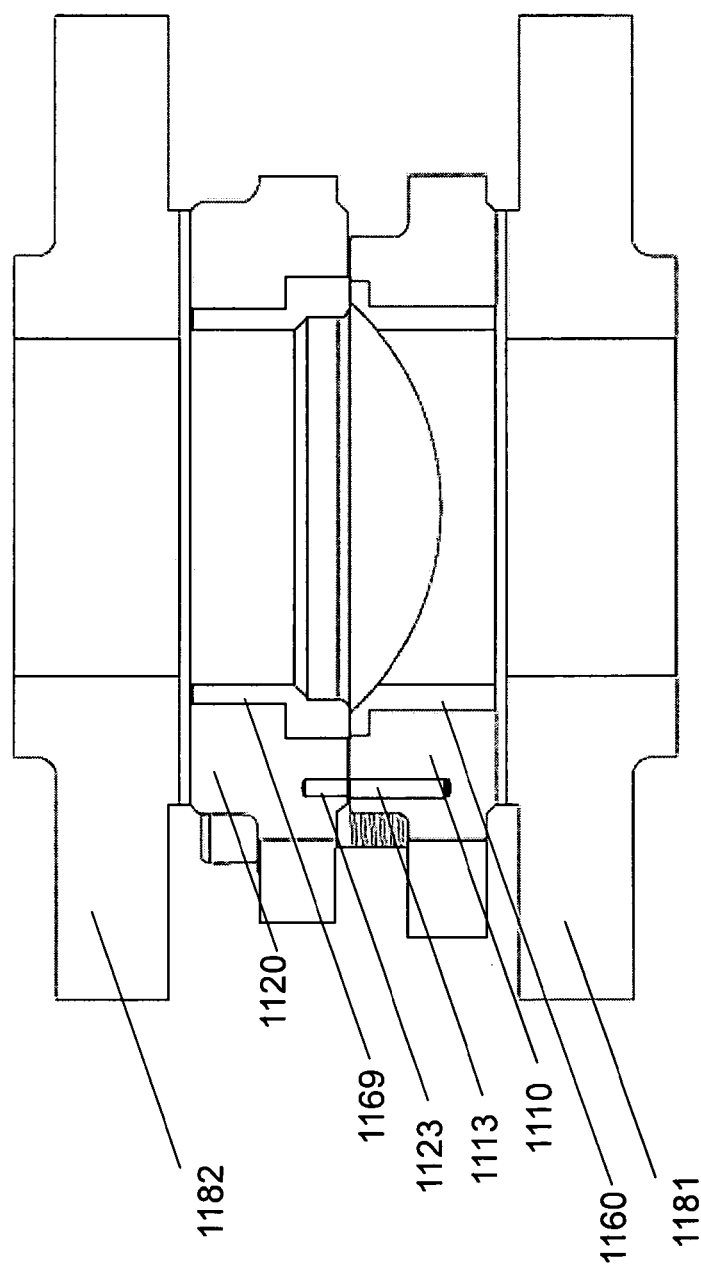
FIG. 11 is a cross-sectional view of a safety head assembly including an inlet safety head with a safety head insert and an outlet safety head with safety head insert.

Embodiments of an outlet safety head insert (1169, 1269, 1369) in an outlet safety head is depicted in FIG. 11, FIG. 12, and FIG. 13. In an embodiment that uses both an inlet safety head insert and an outlet safety head insert, a bite seal (such as depicted in FIG. 8) may be provided between the two safety head inserts. In one embodiment, a bite seal feature (64 in FIG. 8) may be provided in both the inlet and outlet safety head inserts. When two safety head inserts are used, as depicted in FIG. 11 (items 1160 and 1169) and FIG.

13 (items 1360 and 1369), if a bite seal is damaged in any way, either or both safety head inserts can be replaced to ensure a proper seal without having to replace either of the inlet safety head or the outlet safety head. The present disclosure contemplates that outlet safety head inserts of different sizes may be used to provide different features, to save material, and/or to match the internal geometry of an existing or known safety head.

Figure 14:
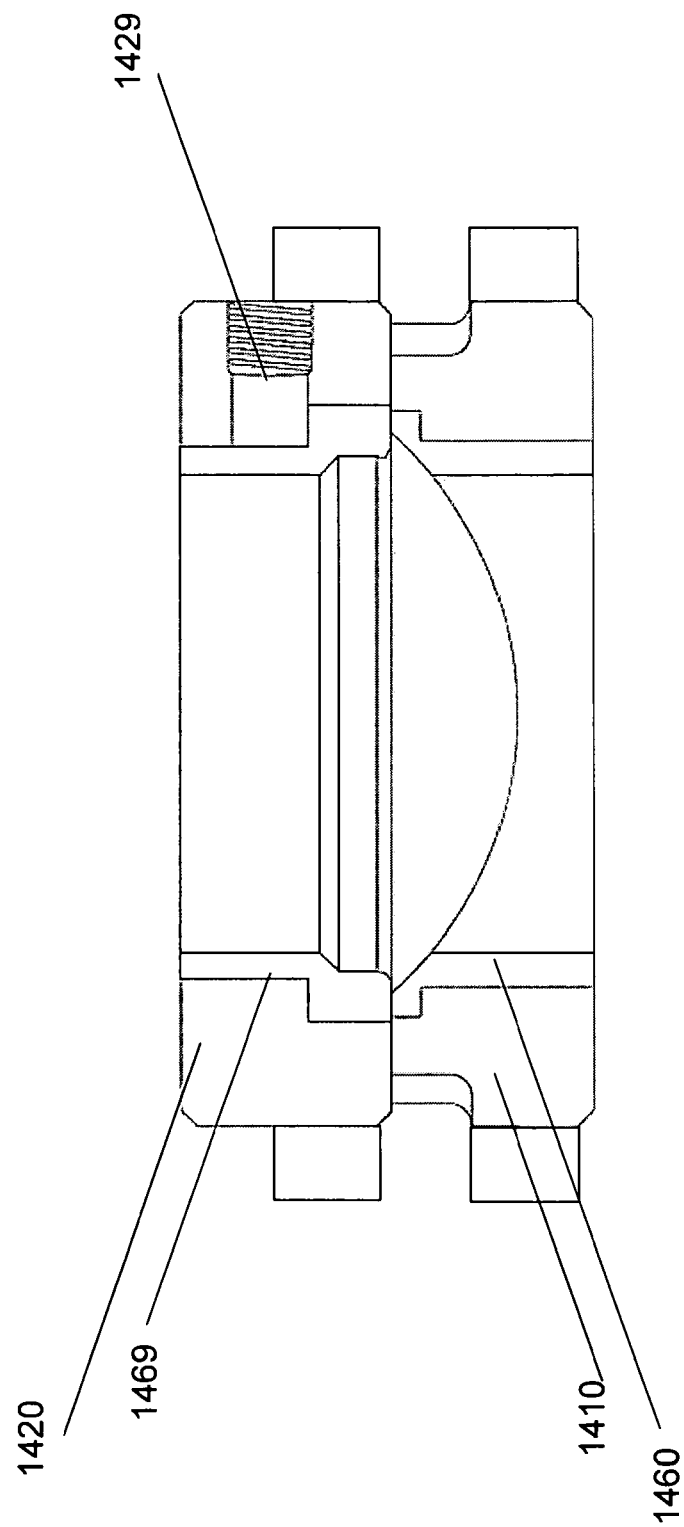
FIG. 14 is a cross-sectional view of a safety head assembly including a sensor tap in an outlet safety head.

In one embodiment, an outlet safety head may be provided with a sensor tap 1429, as illustrated in FIG. 14. FIG. 14 depicts an inlet safety head 1410, an outlet safety head 1420, an inlet safety head insert 1460, and an outlet safety head insert 1469. A sensor tap 1429 may be a thru hole and may have threading. A sensor tap 1429 may be configured for the installation of a magnetic field sensor or any other suitable sensor. An outlet safety head insert 1469 may be configured to allow for proper operation of a sensor installed within the sensor tap 1429. For example, the outlet safety head insert 1469 may be selected so that its thickness will not impede operation of a sensor installed within the sensor tap 1429. In one embodiment, the sensor may be a magnetic field sensor and the outlet safety head insert 1469 may be 3 millimeters thick, or any other appropriate dimension according to the strength of the magnetic field. Although a sensor tap 1429 is illustrated in an outlet safety head 1420, it is also contemplated to place a sensor tap in an inlet safety head.

Figure 15:
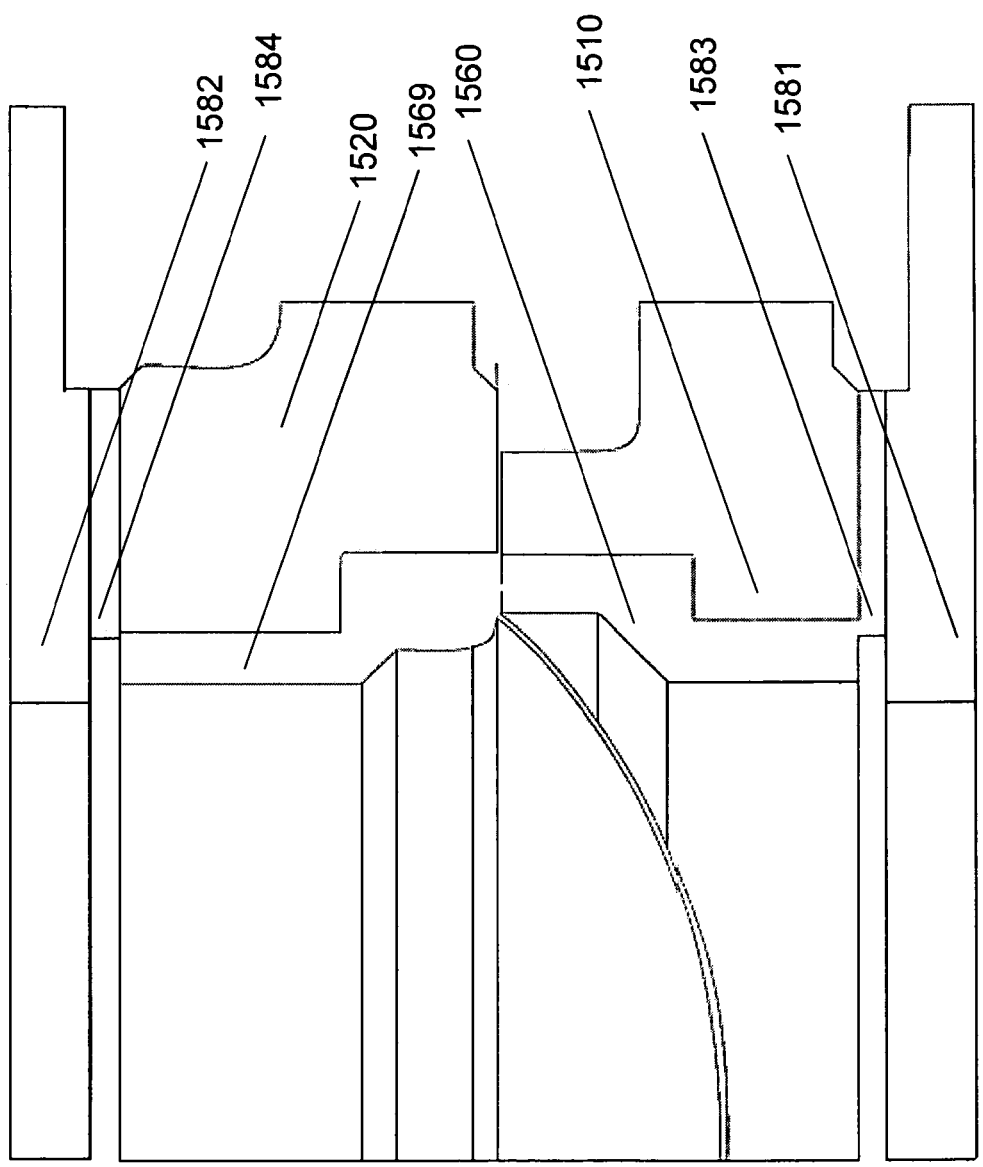
FIG. 15 is a cross-sectional view of a safety head assembly having an inlet safety head insert and an outlet safety head insert, illustrating the use of gaskets.

In one embodiment, one or more gaskets may be provided for use with a safety head assembly. As illustrated in FIG. 15, a first gasket 1583 may be provided between an inlet safety head 1510 and an inlet flange 1581. A second gasket 1584 may be provided between an outlet safety head 1520 and an outlet flange 1582. In one embodiment, a gasket (1583, 1584) may be a type Ia/Ib gasket. A gasket (1583, 1584) may be used to cover the interface between a safety head insert 1560, 1569 and a safety head 1510, 1520. In one embodiment, a gasket and/or a safety head insert may be configured to ensure adequate coverage of the interface between a safety head insert and a safety head.

FIG. 10 illustrates a type IIa/IIb gasket (1083, 1084), which has a smaller outer diameter than a Ia/Ib type gasket.

To ensure proper alignment between an inlet safety head and an outlet safety head, each safety head may be provided with one or more pin holes, which each receives an end of an alignment pin.

Figure 16:
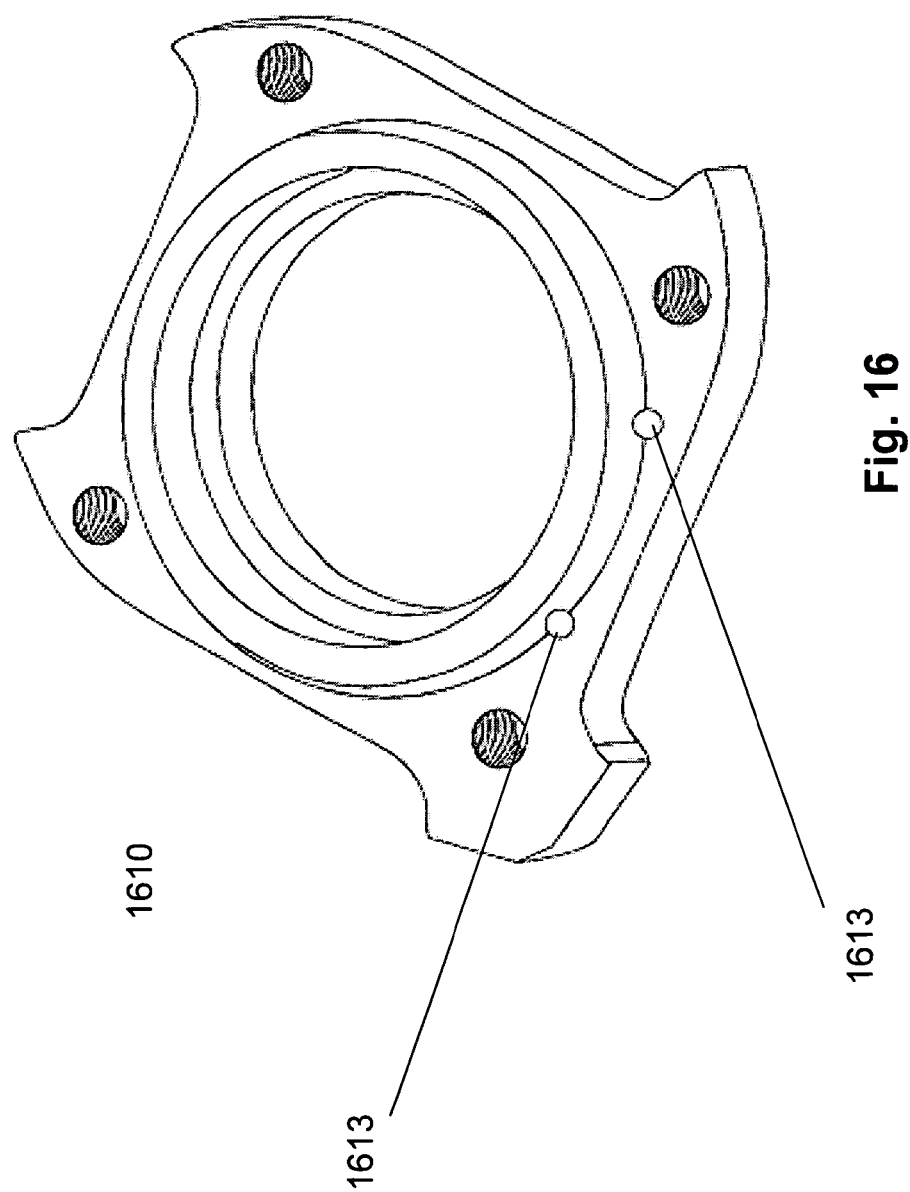
FIG. 16 depicts an inlet safety head with pin holes.
Figure 17:
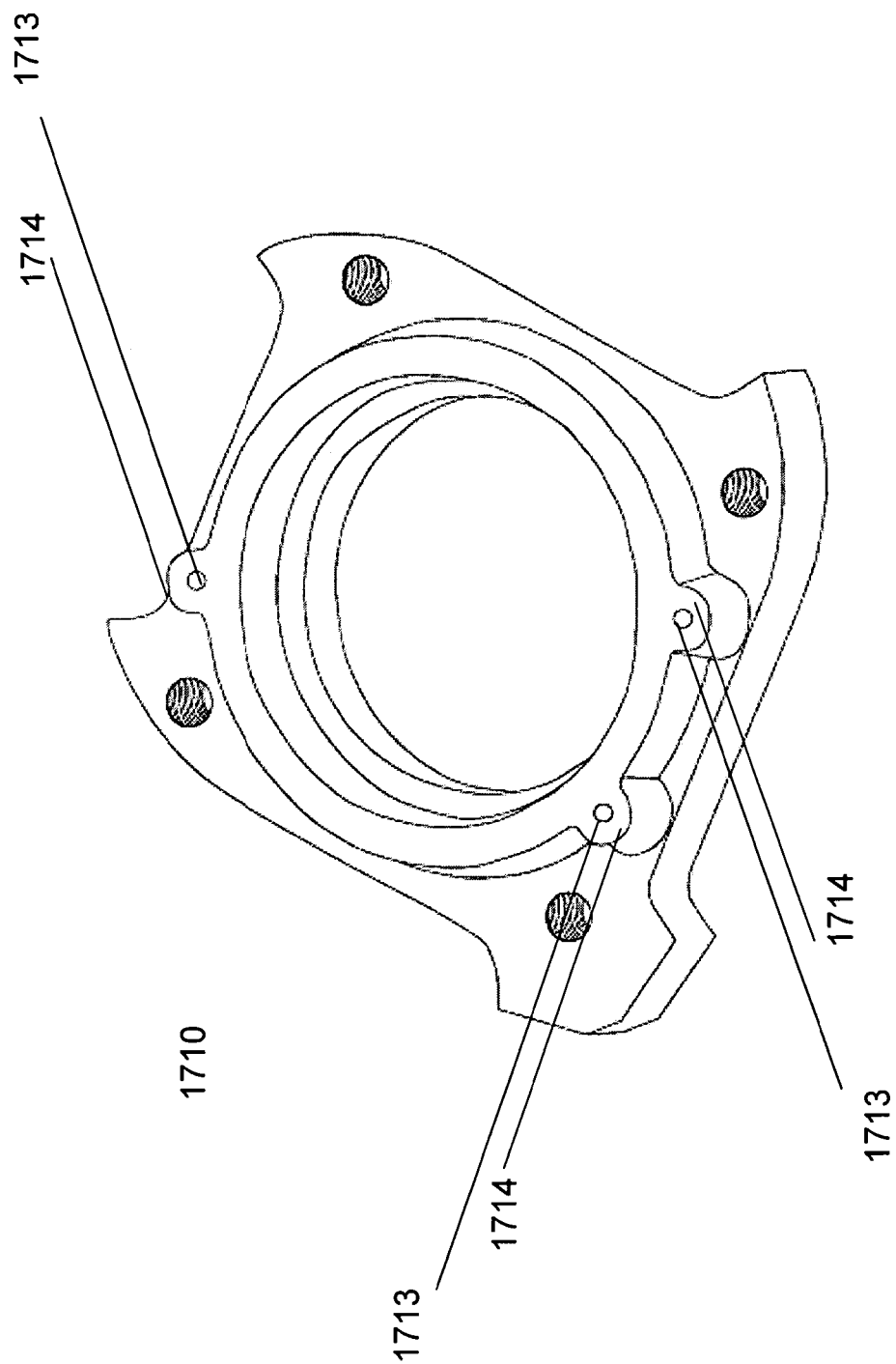
FIG. 17 depicts an inlet safety head with bosses and pin holes.

An inlet safety head 1610 having pin holes 1613 is illustrated in FIG. 16. In another embodiment, as illustrated in FIG. 17, an inlet safety head 1710 may include one or more bosses 1714, where one or more pin holes 1713 may be located. Providing a boss 1714 may allow for the use of a shorter buckling pin between an inlet and an outlet safety head. Providing a boss 1714 may also allow for a pin hole to be drilled into a flat surface. This may provide manufacturing and machining advantages over a safety head without bosses 1714, because such designs (e.g., as illustrated in FIG. 16) may require difficult drilling into a fillet. Although FIG. 17 depicts bosses 1714 on an inlet safety head 1710, it is contemplated that one or more bosses may be placed on an outlet safety head in addition or in the alternative.

Figure 18:
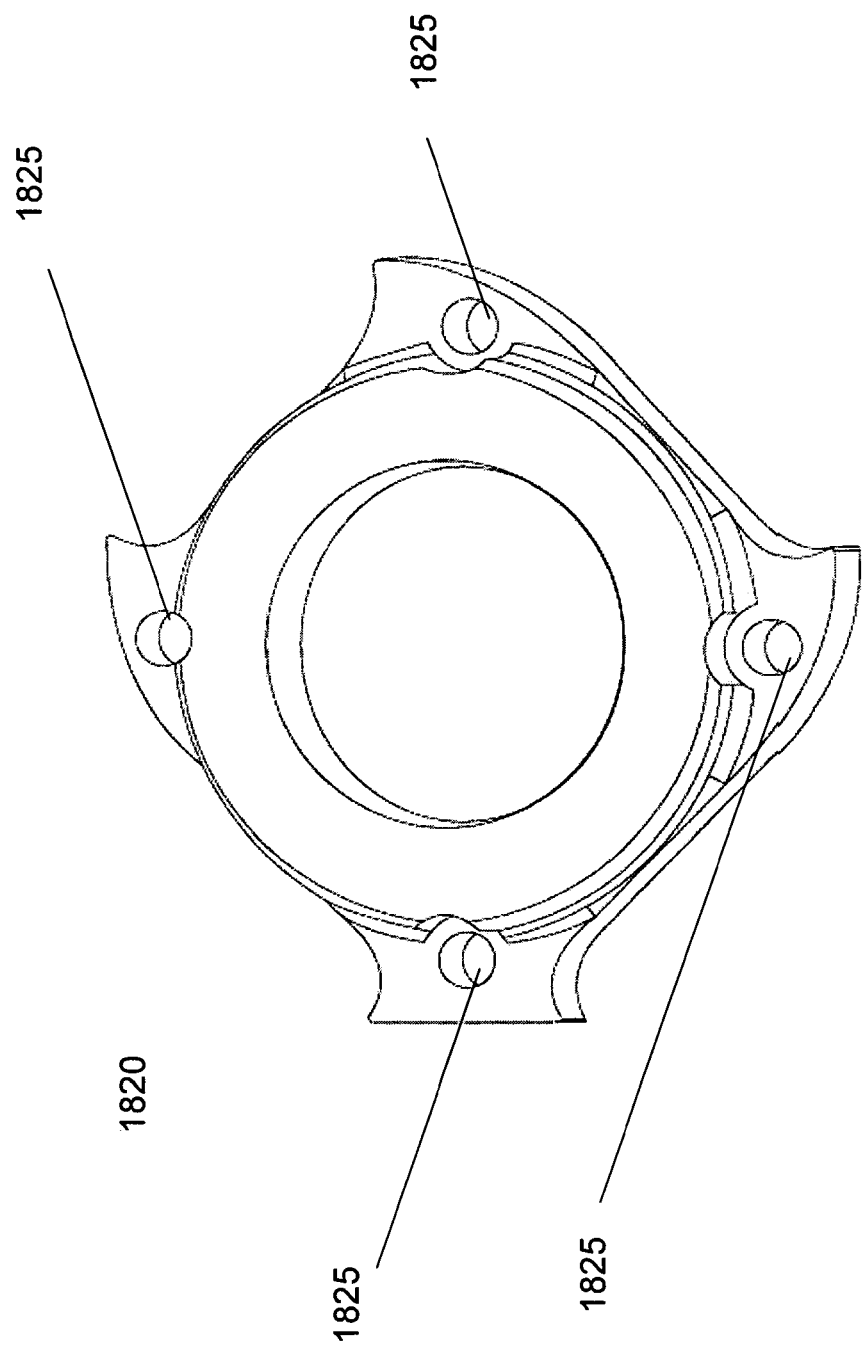
FIG. 18 depicts an outlet safety head.
Figure 19:
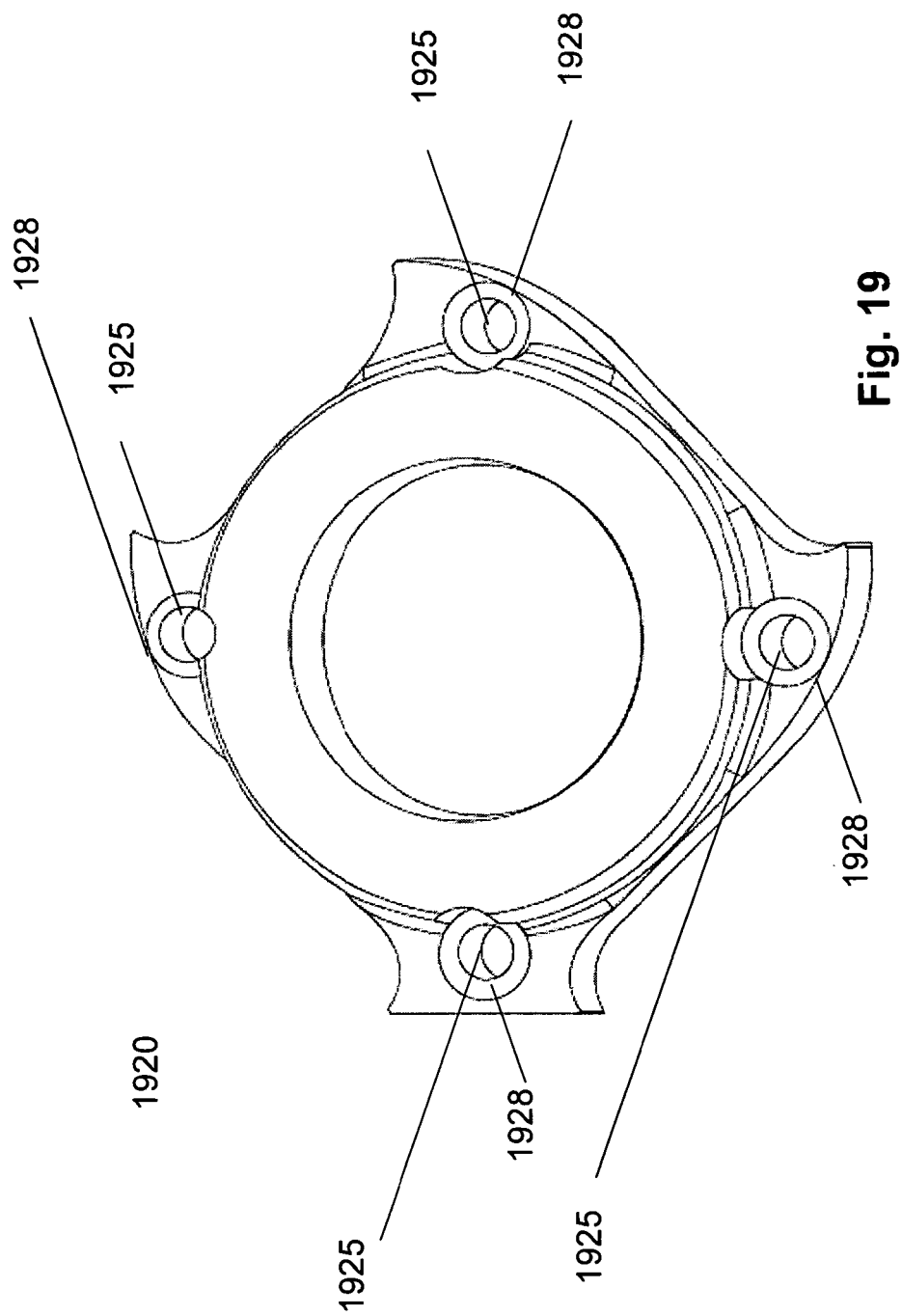
FIG. 19 depicts an outlet safety head with raised spot faces.

An outlet safety head 1820 is illustrated in FIG. 18, showing bolt holes 1825. In another embodiment of an outlet safety head 1920 (FIG. 19), it may be desirable to provide a raised spot face 1928 in which to place bolt holes 1925, as illustrated in FIG. 19. A raised spot face 1928 may be desirable if fluoropolymer bolts, or any other bolts, are used with the safety head and require a machined face to be tightened against it. In one embodiment, the raised spot face 1928 may be formed by casting and then machining as desired.

A raised spot face 1928, as depicted in FIG. 19, may provide advantages. For example, in the absence of a raised spot face, the process of machining a bolt surface may remove material from the thickness of the flange, thereby compromising the flange's integrity. As another example, the entire flange surface (not just the bolt surface) may be machined to provide a machined bolt surface while retaining uniform flange thickness. In either example, if a raised spot face is not provided, it may be necessary to increase the thickness of the pre-machining flange to compensate for the depth of the subsequent bore or other machining process. A raised spot face may allow one or more bolt surfaces to be leveled without compromising the overall thickness of the flange. Thus, by using a raised spot face 1928, the present disclosure may save material and cost. Although a raised spot face 1928 is illustrated in an outlet safety head 1920, it is contemplated that a raised spot face may also be used with an inlet safety head.

Figure 20:
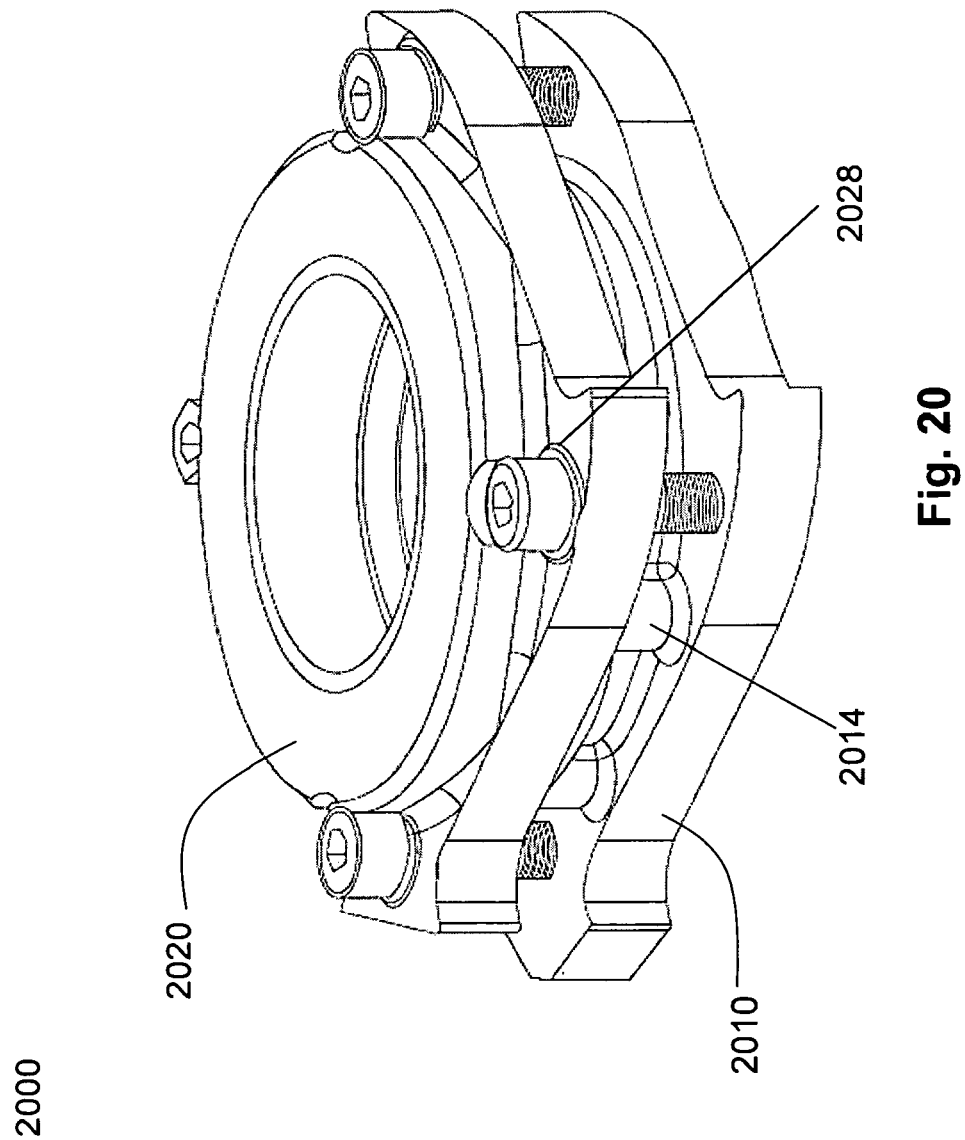
FIG. 20 depicts an embodiment of an assembled safety head assembly.

FIG. 20 depicts an embodiment of an assembled safety head assembly 2000. As illustrated, the inlet safety head 2010 is provided with bosses 2014 for pin holes (not shown). Also as illustrated, the outlet safety head 2020 is provided with raised spot faces 2028.

Figure 21:
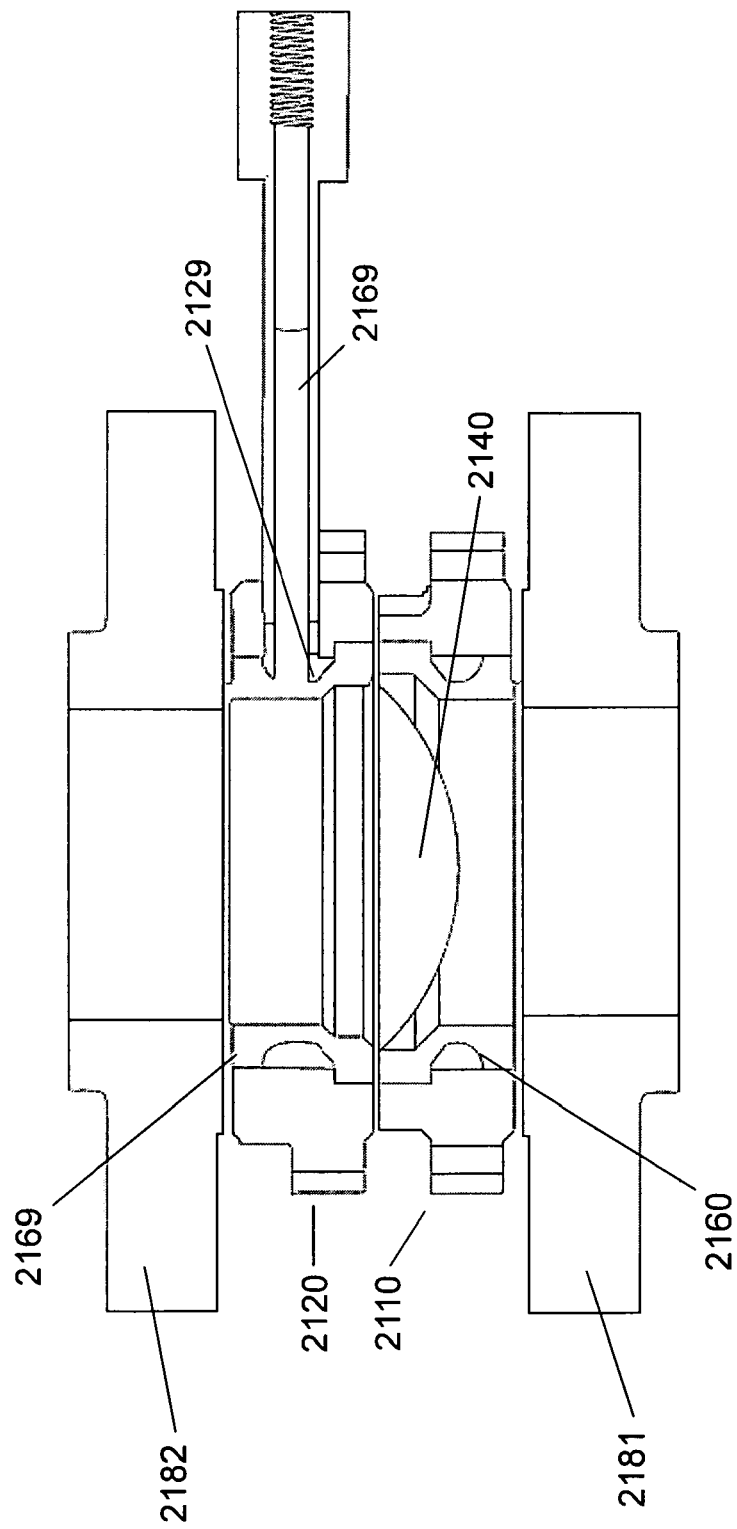
FIG. 21 depicts another embodiment of an assembled safety head assembly in cross-section.

FIG. 21 depicts an embodiment of an assembled safety head assembly 2100 in cross-section. As illustrated, a sensor 2199 is inserted into a sensor bore 2129 in the outlet safety head 2120. Additionally or alternatively, it is also contemplated that a sensor bore, and a sensor, may be placed in the inlet safety head 2110. The sensor 2199 may be inserted radially into a sensor bore 2129. As illustrated in FIG. 21, a first safety head insert 2160 may be provided within a bore of the inlet safety head 2110 and a second safety head insert 2169 may be provided within a bore of the outlet safety head 2120. In one embodiment, as shown in FIG. 21, the safety head insert 2160, 2169 may not contact the entire bored surface of the safety head 2110, 2120. Rather, the safety head insert 2160, 2169 may be shaped to reduce the amount of material used in the safety head insert 2160, 2169, while retaining a tight and/or flush seal with the top and/or bottom of the safety head 2110, 2120.

Figure 22:
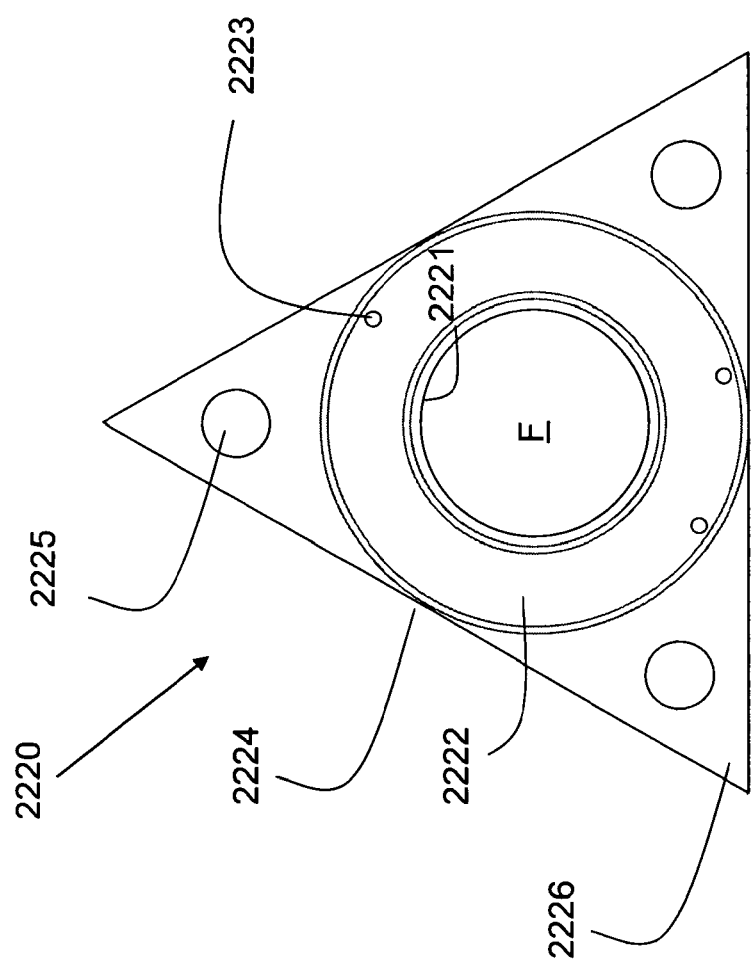
FIG. 22 depicts an embodiment of a triangular-shaped safety head.

Another embodiment of an outlet safety head 2220 is illustrated in FIG. 22. In the embodiment illustrated in FIG. 22, the outlet safety head 2220 may include a flange 2222, which may be circular, and projections 2226. The projections may extend outwards from the safety head 2220, and may be positioned around 120-degrees apart about the perimeter of the safety head, thereby forming an equilateral triangular profile. The 120-degree angles may be varied so that the overall shape of the safety head may be an isosceles triangle or even a scalene triangle. A straight edge 2224 may run between each projection 2226. In an embodiment wherein the flange 2222 is circular, the straight edge 2224 may run tangentially to the circle. An outlet bore 2221 at the center of the outlet safety head 2220 may define a fluid flow path F. Projections 2226 each include a through-bore that defines a bolt through-hole 2225. The flange includes a series of asymmetrical partial bores that define pin holes 2223. The configuration of the pin holes 2223 facilitates proper alignment of the outlet safety head 2220 with an inlet safety head (not shown). An inlet safety head according to the embodiment of FIG. 22 may reduce the material required as compared to a safety head with more than three projections, or as compared to a known square-shaped safety head. In addition, a triangular-shaped safety head may provide advantages when fitting a safety head assembly, including any assembly bolts, into a small place or between flanges of small nominal-size pipes.

The safety head of FIG. 22 may provide the feature of projections 2226 having smaller material thickness than that of a flange 2222. Providing projections 2226 with smaller material thickness further reduces the weight and material cost of the safety head. The material thickness savings may be similar to that illustrated, for example, in FIG. 2B, discussed above.

Although FIG. 22 illustrates only an outlet safety head, it is to be understood that an inlet safety head may be provided having substantially the same triangular shape. It is contemplated that a triangular-shaped safety head, such as illustrated in FIG. 22 may be provided with any of the features disclosed above in connection with other embodiments of a safety head or safety head assembly, including, but not limited to: a wave face with a blended radius of curvature, one or more protrusions in the shape of a handle, an insert (for either the inlet safety head and/or an outlet safety head), a bite seal, a J-bolt, a recess for one or more bolt heads, a gasket, a sensor tap, a boss for a pin hole, or a raised spot face. It is also contemplated that a triangular-shaped safety head may provide the same benefits, or many of the same benefits, as achieved by other disclosed embodiments of a safety head and/or safety head assembly, including, but not limited to: reduction in material and manufacturing costs, visible and/or accessible assembly bolts, improved alignment, pre-torqued configurations, and placement of one or more sensors.

Figure 23:
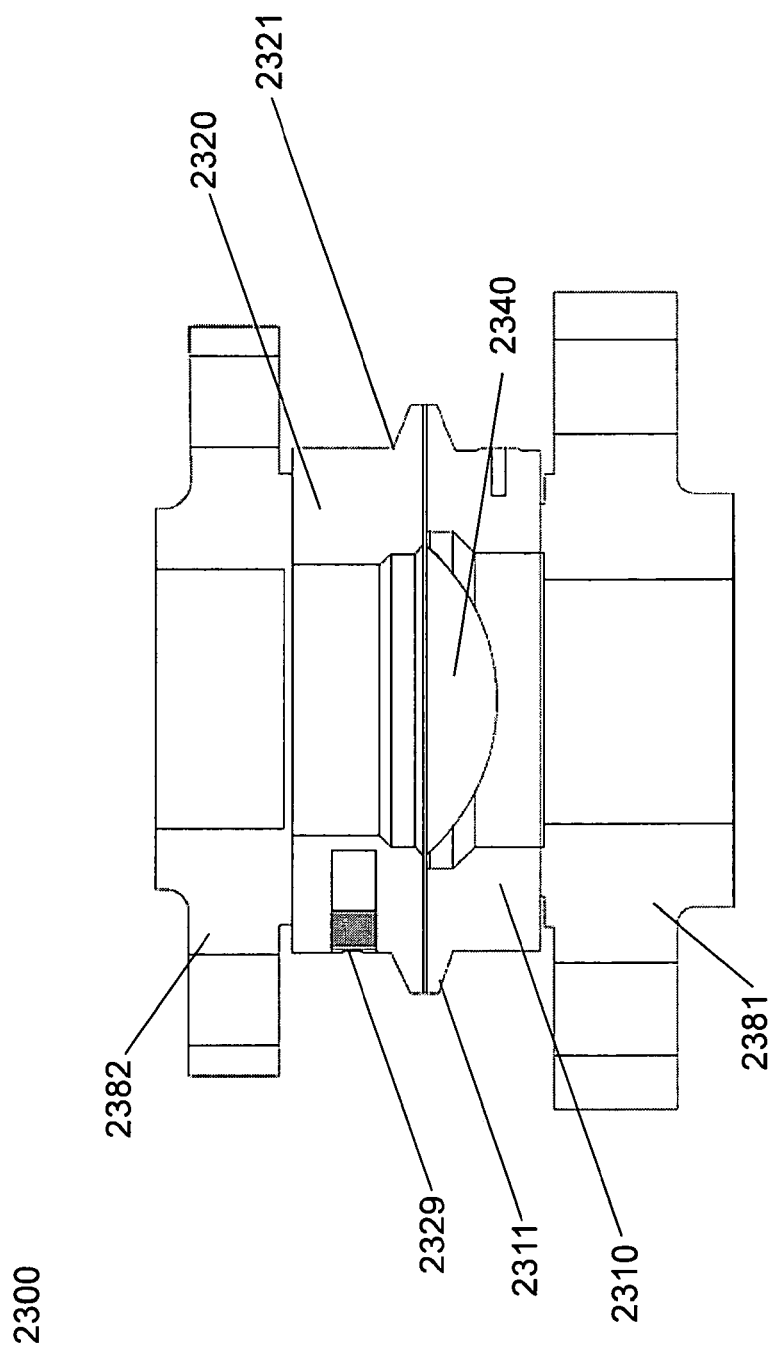
FIG. 23 depicts an embodiment of a safety head assembly, wherein the inlet safety head and outlet safety head are provided with peripheral projections.

Another embodiment of a safety head assembly 2300 is illustrated in FIG. 23. In the embodiment illustrated in FIG. 23, an inlet safety head 2310 is provided with a peripheral projection 2311. An outlet safety head 2320 is also provided with a peripheral projection 2321. As illustrated, the peripheral projections 2311, 2321 of the inlet and outlet safety heads 2310, 2320 are aligned with one another, with an insert device 2340 between them. FIG. 23 also illustrates a sensor tap 2329 in which a sensor may be inserted.

Figure 24:
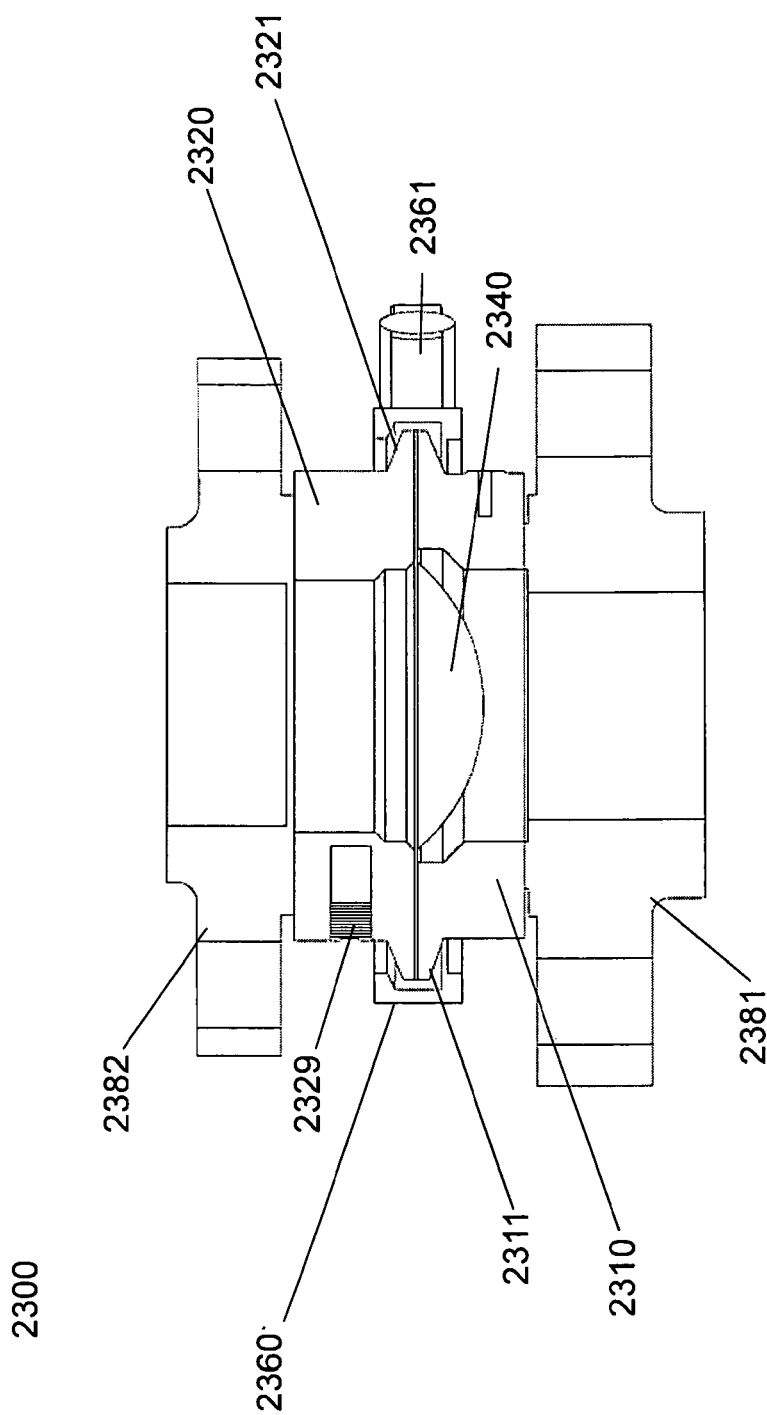
FIG. 24 depicts the safety head assembly of FIG. 23 with a clamp provided.

FIG. 24 illustrates the safety head assembly 2300 of FIG. 23 with a clamp 2360 also provided. A clamp 2360, when tightened against the slanted surfaces of the projections 2311, 2321 of the inlet and outlet safety heads 2310, 2320, will force the inlet and outlet safety heads 2310, 2320 together. The clamp 2360 may be of a single piece or may be segmented and hinged, depending on the application. The slanted surfaces may be angled as desired so as to vary the total applied torque and/or also to vary the rate at which torque may be applied. In this fashion, an insert device 2340 may be held between the inlet and outlet safety heads 2310, 2320. In one embodiment, an insert device 2340 may be pre-torqued between the inlet and outlet safety heads 2310, 2320. By using a clamp 2360, it may be possible to achieve additional material savings as compared to known safety heads and safety head assemblies.

Figure 25:
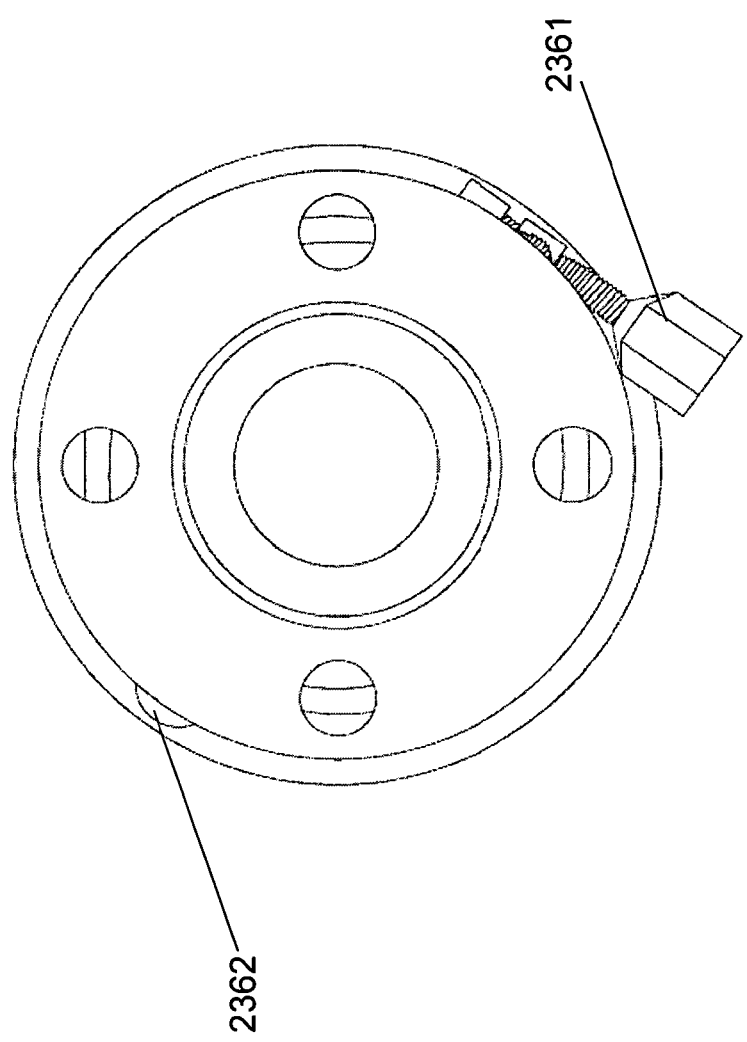
FIG. 25 is a view of the safety head assembly of FIGS. 23 and 24, illustrating a clamp screw.

FIG. 25 is a view of the safety head assembly 2300 of FIGS. 23 and 24, further illustrating a clamp screw 2361. In one embodiment, a clamp may be a clamp ring extending around—or partially around—the inlet and outlet safety heads. In another embodiment, a clamp ring may be made of two C-shaped sections, joined together at a joint 2362. When tightened, the clamp screw 2361 may cause the ends of the clamp ring to be forced together. In this fashion, the clamp may force the inlet and outlet safety heads together. In the illustrated embodiment, a single screw 2361 is provided. Although a clamp screw is described, any suitable mechanism of forcing the ends of the clamp ring together may be utilized. For example, a "quick release" skewer and latch system may be used to force the ends of the clamp ring together.

Figure 26:
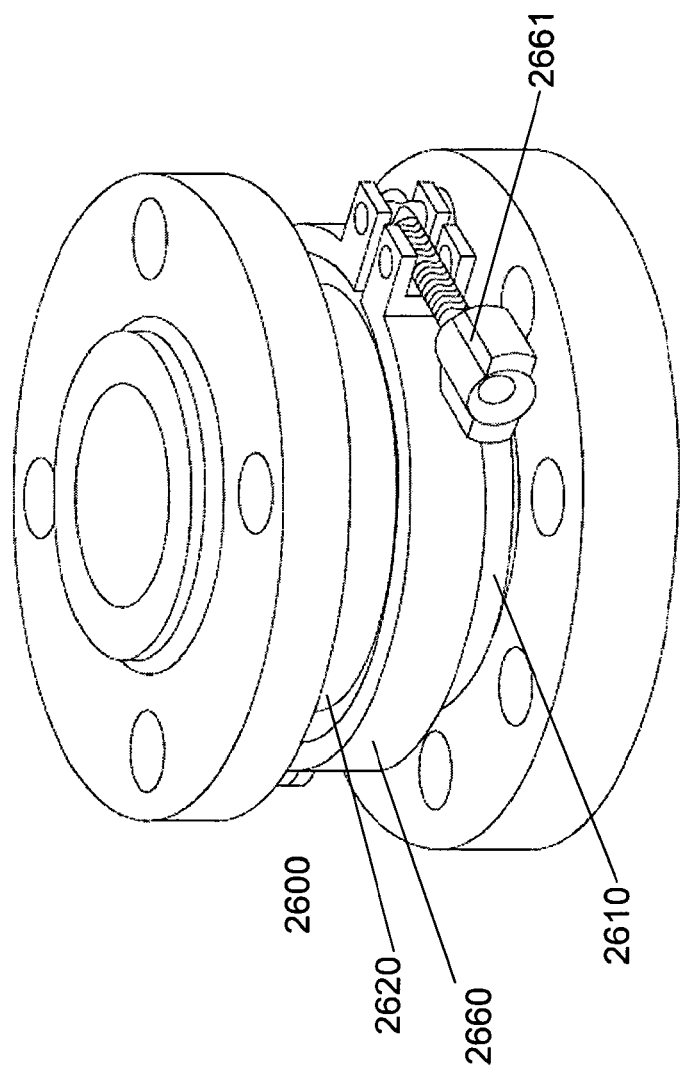
FIG. 26 depicts another embodiment of a safety head assembly using a clamp ring and a clamp screw.

FIG. 26 illustrates another embodiment of a safety head assembly 2600 using a clamp ring 2660 and a clamp screw 2661. The clamp screw 2661 may be tightened, causing the clamp 2660 ring to force the inlet and outlet safety heads 2610, 2620 together.

Figure 27:
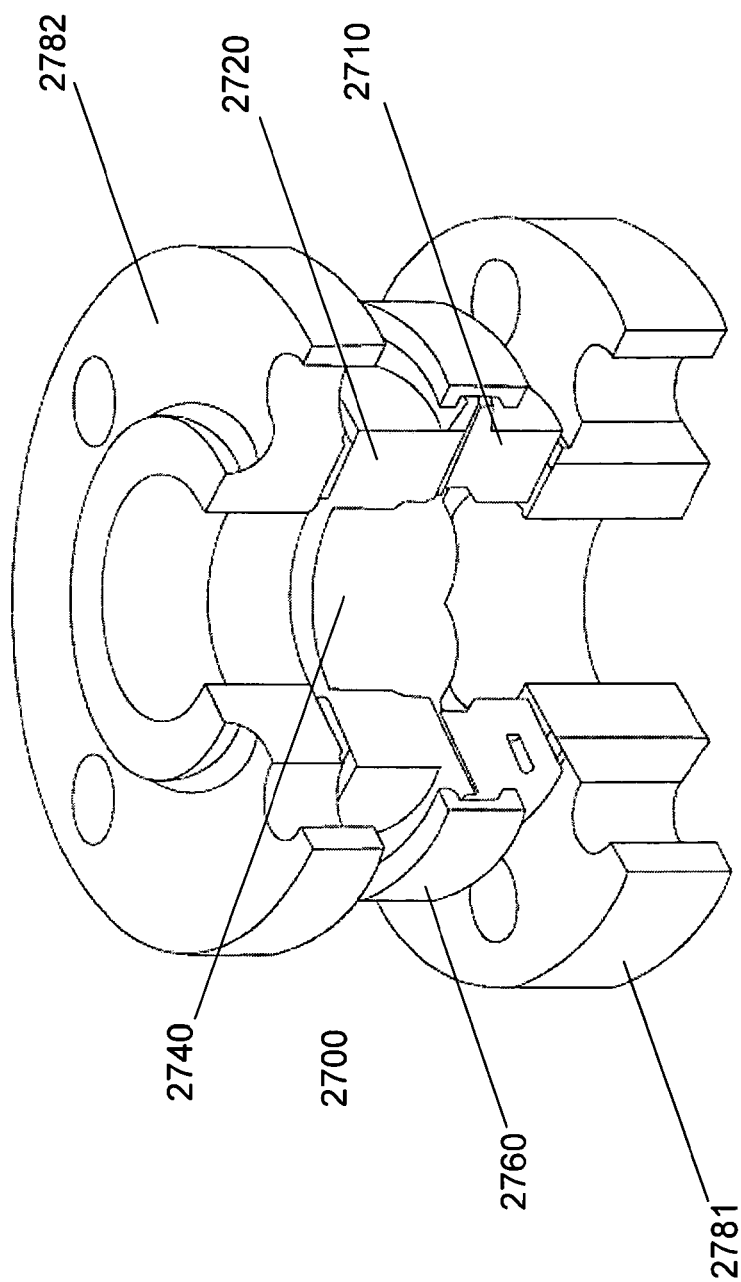
FIG. 27 is a partially cut away safety head assembly using a clamp ring.

FIG. 27 illustrates a partially cut away safety head assembly 2700 using a clamp ring 2760. As illustrated, an insert device 2740 is installed between an inlet safety head 2710 and an outlet safety head 2720. The inlet safety head 2710 and outlet safety head 2720 are held together by a clamp ring 2760. The safety head assembly 2700 comprising the inlet and outlet safety heads 2710, 2720 is installed between an inlet pipe flange 2781 and an outlet pipe flange 2782.

Figure 28:
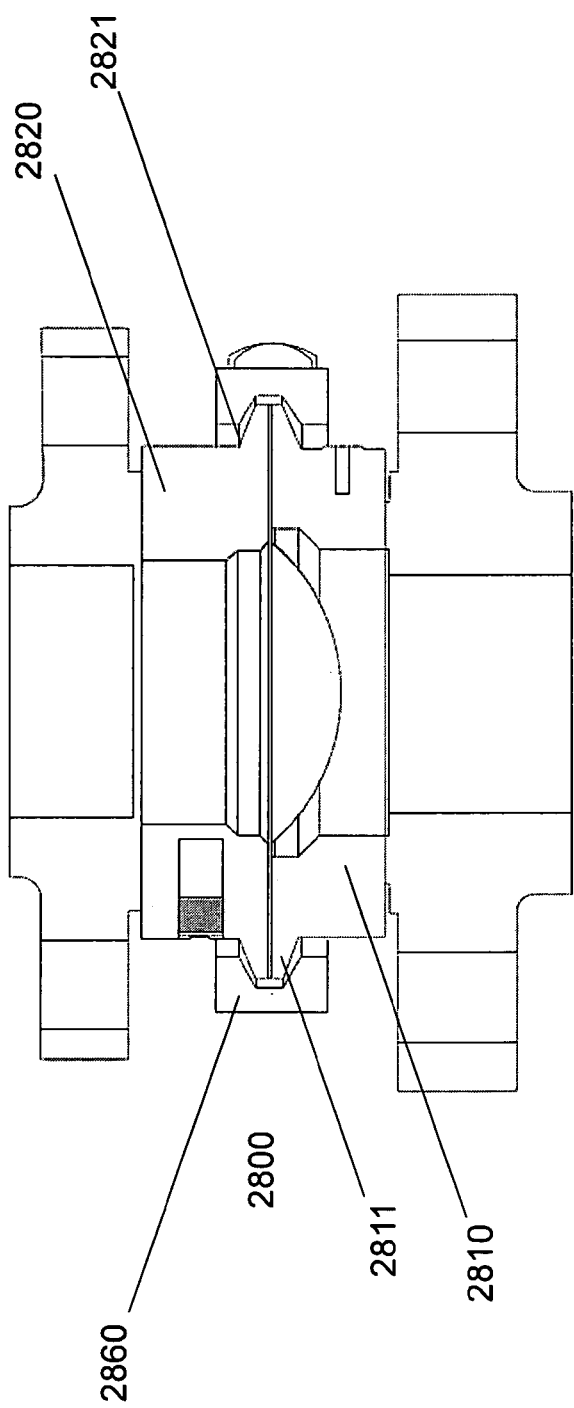
FIG. 28 depicts another embodiment of a safety head assembly using a clamp.

FIG. 28 illustrates another embodiment of a safety head assembly 2800 using a clamp 2860. As illustrated in FIG. 28, the clamp 2860 includes a slanted surface configured to engage with the slanted surface of peripheral projection 2811 and peripheral projection 2821. The embodiment shown in FIG. 28 may provide higher-pressure clamping as compared to the embodiment shown in FIG. 24. It is contemplated that any suitable clamp may be selected to achieve the desired clamping pressures.

Figure 29:
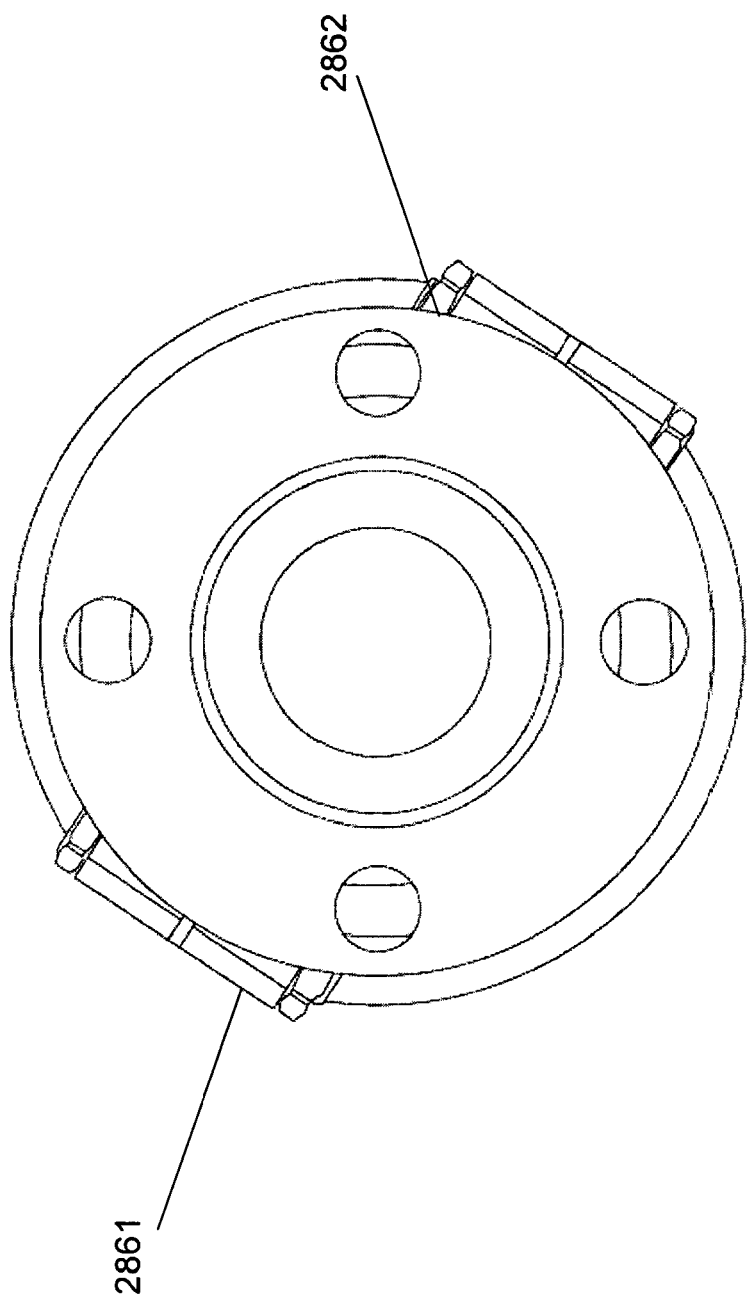
FIG. 29 is another view of the embodiment illustrated in FIG. 28, showing two clamp screws.

FIG. 29 is another view of the embodiment illustrated in FIG. 28. FIG. 29 provides a more detailed view of two clamp screws 2861, 2862 that may be used to tighten the clamp. The clamp screws 2861, 2862 illustrated in FIG. 29 (and the clamp screw 2860 illustrated in FIG. 25) are exemplary only. Any suitable mechanism for tightening a clamp may be used. Additionally, although FIG. 25 illustrates one clamp screw 2360, and FIG. 29 illustrates two clamp screws 2861, 2862, it is contemplated that any number of suitable clamp screws or other clamp tightening mechanisms may be used.

Figure 30:
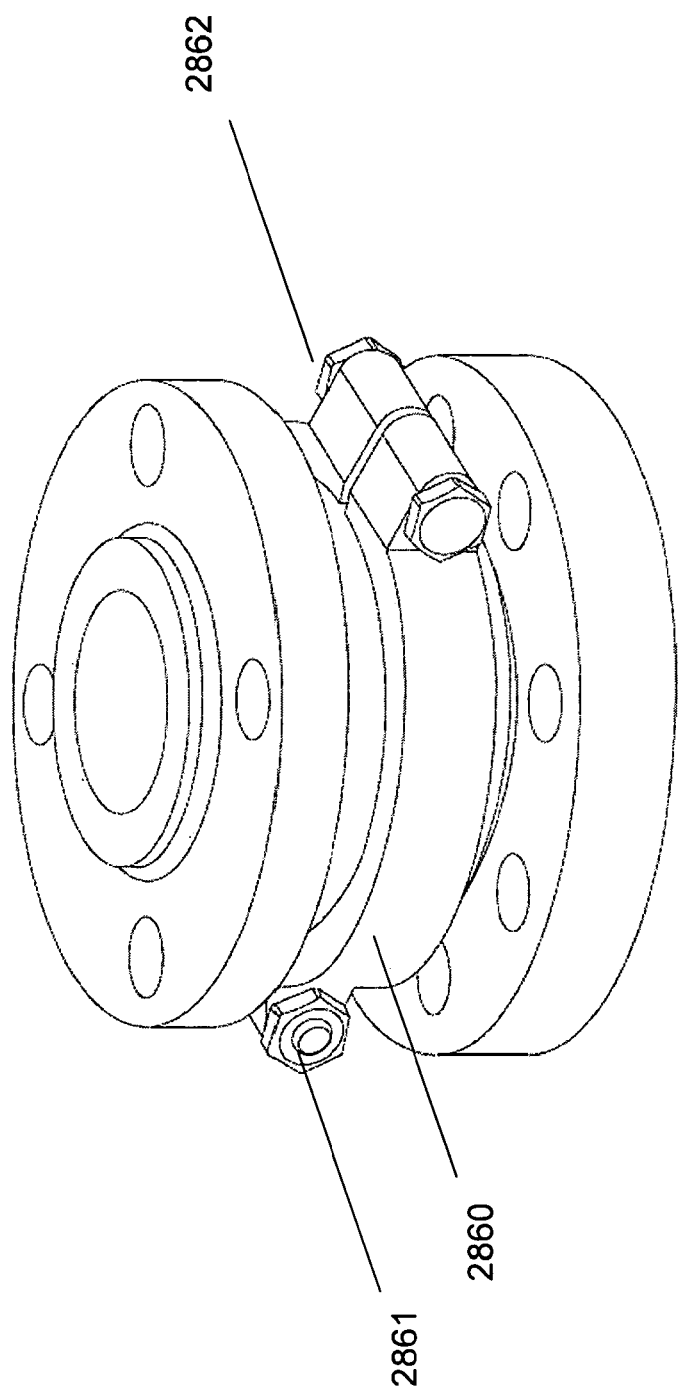
FIG. 30 is another view of the embodiment illustrated in FIGS. 28 and 29 using a clamp ring and two clamp screws.

FIG. 30 is another view of the embodiment shown in FIGS. 28 and 29, illustrating safety head assembly using a clamp ring 2860 and two clamp screws 2861, 2862.

Figure 31:
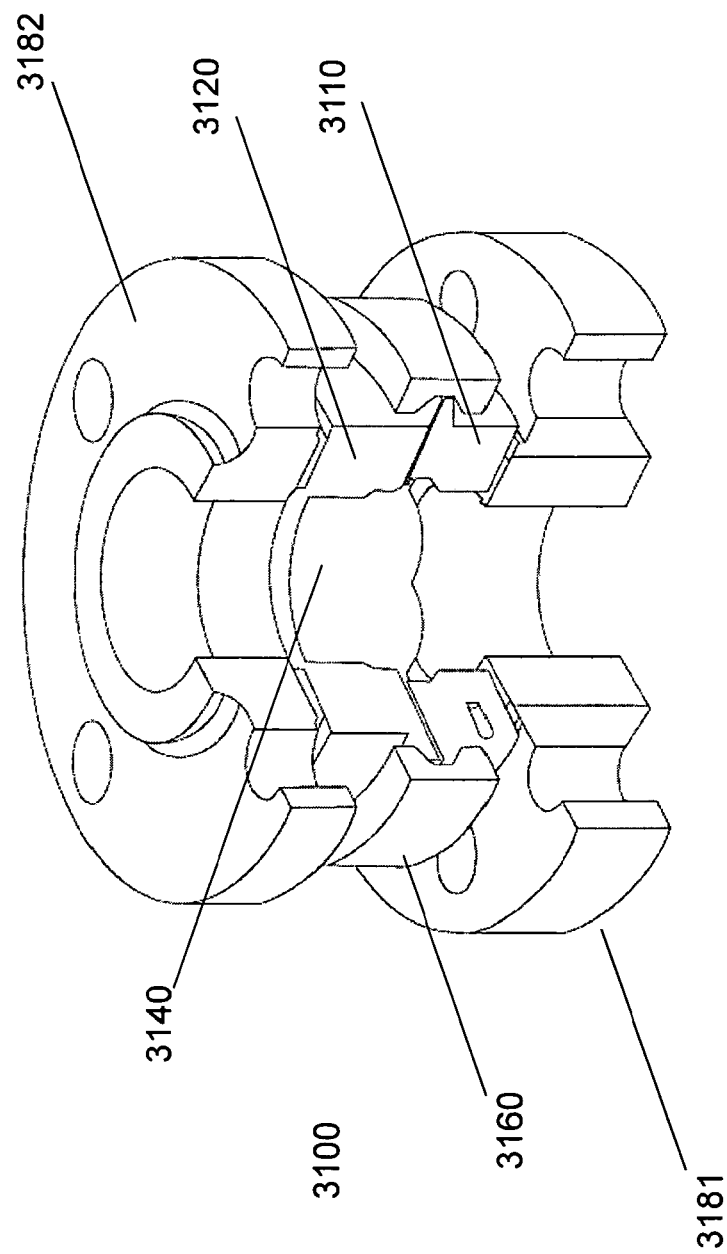
FIG. 31 illustrates a partially cut away safety head assembly using a clamp ring.

FIG. 31 illustrates a partially cut away safety head assembly 3100 using a clamp ring 3160. As illustrated, an insert device 3140 is installed between an inlet safety head 3110 and an outlet safety head 3120. The inlet safety head 3110 and outlet safety head 3120 are held together by a clamp ring 3160. The safety head assembly 3100 comprising the inlet and outlet safety heads is installed between an inlet pipe flange 3181 and an outlet pipe flange 3182.

Figure 32:
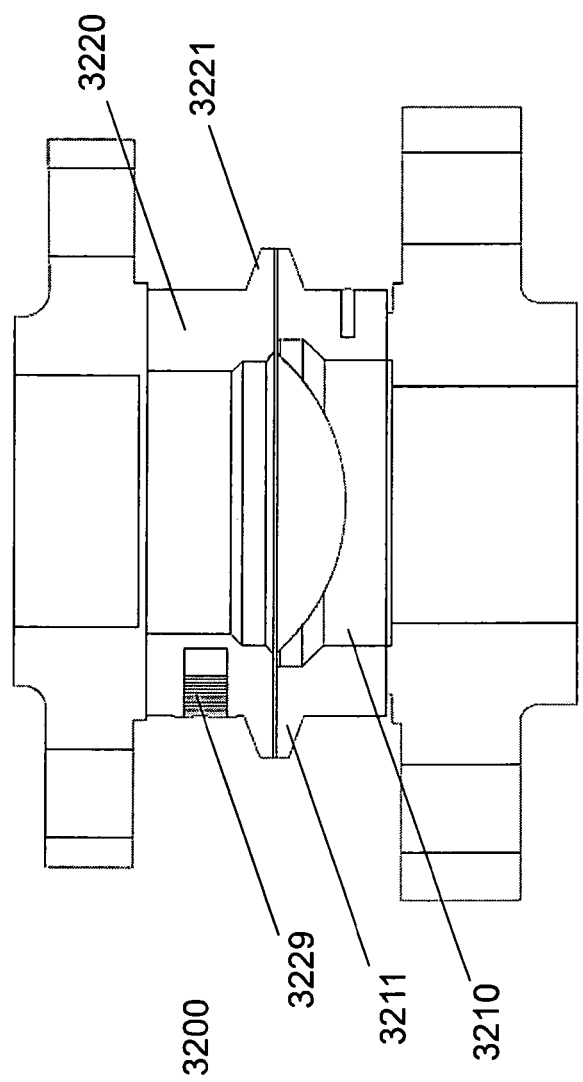
FIG. 32 illustrates another embodiment of a safety head assembly, wherein the inlet safety head and outlet safety head each have a peripheral projection.
Figure 33:
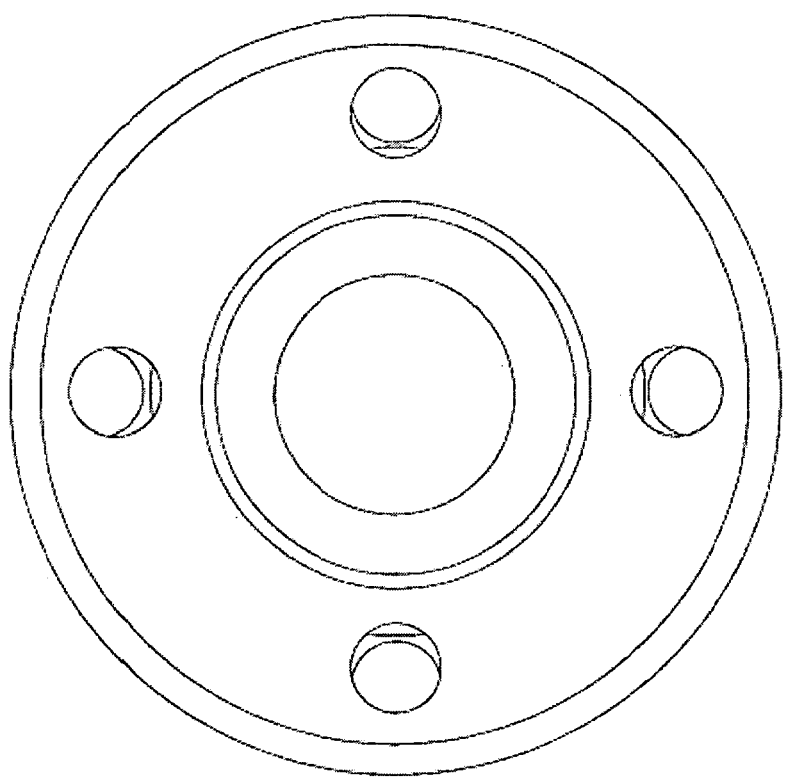
FIG. 33 is another view of the embodiment illustrated in FIG. 32, viewed from above.

FIG. 32 illustrates another embodiment of a safety head assembly 3200. In the embodiment illustrated in FIG. 32, an inlet safety head 3210 is provided with a peripheral projection 3211. An outlet safety head 3220 is also provided with a peripheral projection 3221. As illustrated, the peripheral projections 3211, 3221 of the inlet and outlet safety heads are aligned with one another. FIG. 32 also illustrates a sensor tap 3229. FIG. 33 is another view—from above—of the safety head assembly 3200 illustrated in FIG. 32.

Figure 34:
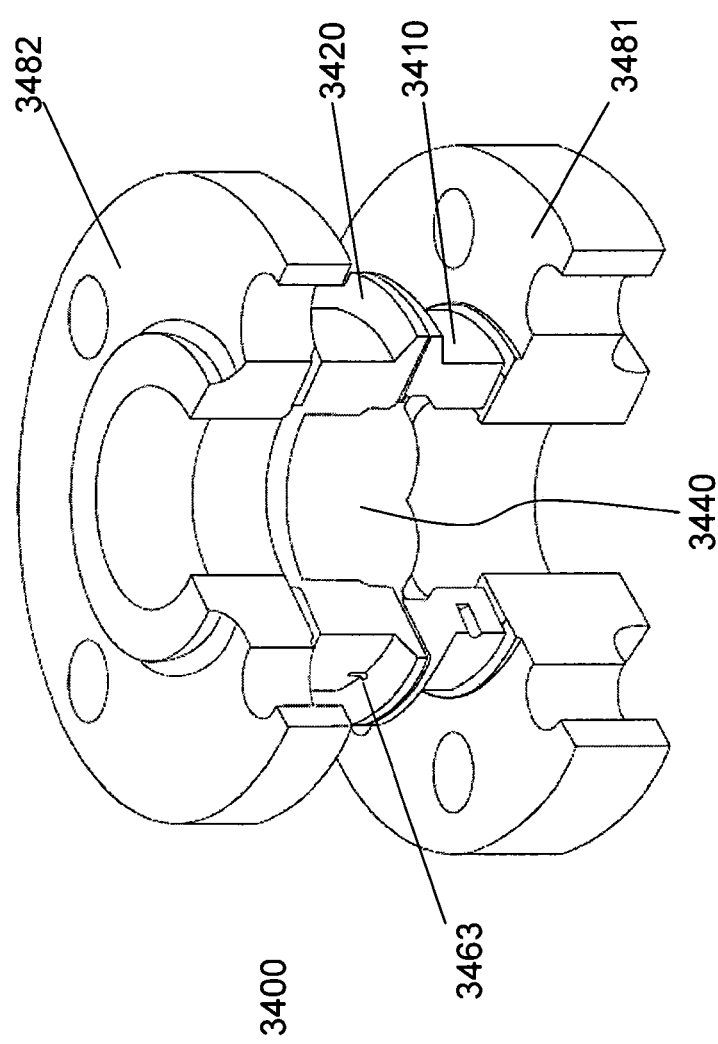
FIG. 34 illustrates a partially cut away safety head assembly.

FIG. 34 illustrates a partially cut away safety head assembly 3400. As illustrated, an insert device 3440 is installed between an inlet safety head 3410 and an outlet safety head 3420. The safety head assembly 3400 comprising the inlet and outlet safety heads is installed between an inlet pipe flange 3481 and an outlet pipe flange 3482. As illustrated, a dowel-pin drilled hole 3463 may protrude through the outlet safety head wall. A pin (not shown) may be used with the dowel-pin drilled hole 3463. The dowel-pin drilled hole 3463 may be used with a pin to align or position the inlet and outlet safety heads together prior to clamping. The pin may also align with a notch or hole in the flange of an insert device (e.g., rupture disk) to ensure its proper position relative to the inlet and outlet safety heads.

A safety head according to the present disclosure may provide the benefit of reduced material volume as compared to prior safety heads, such as, for example, the SRB-7RS type head offered commercially by BS&B Safety Systems. The disclosed safety head may include a uniquely designed exterior that may improve centering and anchorage between pipe flanges. The disclosed safety head may allow for removal from between companion flanges while minimizing the number of studs that need to be removed, as compared to prior safety heads. The disclosed safety head may have the same internal dimensions as a known safety head and, therefore may be able to provide the same or similar performance characteristics. The disclosed safety head may accommodate a sensor or other such equipment. The disclosed safety head may allow for torque value check and adjustment after installation. The disclosed safety head may have minimal torque sensitivity. The disclosed safety head may include J-bolt compatibility.

While the disclosed safety head assembly has been described as providing an insert member within the inlet safety head, the disclosure is not intended to be limited to this particular structure. For example, the insert member may be provided within the outlet safety head. In addition to pressurized systems, the device of this application may further be installed in any number of sealed systems that include pipe flanges and flange bolts. Additionally, although the projections (waves and handle) are all depicted as being thinner than the flange portion, it is contemplated that only one projection (or fewer than all projections) of a safety head may be thinner than the flange portion.

It is contemplated that individual features of one embodiment may be added to, or substituted for, individual features of another embodiment. Accordingly, it is within the scope of this disclosure to cover embodiments resulting from substitution and replacement of different features between different embodiments. It is also within the scope of this disclosure to provide features from an inlet safety head to an outlet safety head, and vice versa.

The above described embodiments and arrangements are intended only to be exemplary of contemplated apparatus and methods. Other embodiments will be apparent to those skilled in the art from consideration of the specification and practice of the disclosure herein. It is intended that the specification and examples be considered as exemplary only.

What is claimed is:

1. A safety head, comprising:
  a circular flange portion having an inner bore defining a fluid flow path, the circular flange portion having an upper flat flange surface and a lower flat flange surface,
  at least one protrusion extending outwardly from the circular flange portion and defining at least one bolt hole, wherein the at least one protrusion has a face exhibiting a blended radius of curvature, wherein the at least one protrusion is a wave, and wherein the at least one protrusion has an upper protrusion surface and a lower protrusion surface;
  wherein the distance between the upper flat flange surface and lower flat flange surface defines a first thickness;
  wherein the distance between the upper protrusion surface and the lower protrusion surface defines a second thickness; and
  wherein the second thickness is less than the first thickness.

2. The safety head of claim 1, wherein the circular flange portion defines an outer surface, and wherein the circular flange portion further defines a sensor bore through the outer surface toward the inner bore.

3. The safety head of claim 2, wherein the sensor bore extends completely through the circular flange portion into the inner bore.

4. The safety head of claim 2, wherein the sensor bore defines a threaded tap.

5. A safety head assembly, comprising:
  an inlet safety head comprising:
    a circular flange portion having an inner bore defining a fluid flow path, the circular flange portion having an upper flat flange surface and a lower flat flange surface,
    at least one protrusion extending outwardly from the circular flange portion and defining at least one bolt hole, wherein the at least one protrusion has a face exhibiting a blended radius of curvature, wherein the at least one protrusion is a wave, and wherein the at least one protrusion has an upper protrusion surface and a lower protrusion surface;
    wherein the circular flange portion is thicker than the at least one protrusion;
  an outlet safety head comprising:
    a circular flange portion having an inner bore defining a fluid flow path, the circular flange portion having an upper flat flange surface and a lower flat flange surface,
    at least one protrusion extending outwardly from the circular flange portion and defining at least one bolt hole, wherein the at least one protrusion has a face exhibiting a blended radius of curvature, wherein the at least one protrusion is a wave, and wherein the at least one protrusion has an upper protrusion surface and a lower protrusion surface;
    wherein the circular flange portion is thicker than the at least one protrusion; and
  at least one bolt having a head and a threaded portion, the at least one bolt extending between the at least one bolt hole of the inlet safety head and the at least one bolt hole of the outlet safety head to join the inlet safety head to the outlet safety head; wherein
    the head projects above the at least one protrusion of the outlet safety head; and
    at least a portion of the threaded portion is exposed between the at least one protrusion of the inlet safety head and the at least one protrusion of the outlet safety head.

6. The safety head assembly of claim 5, further comprising:
  an insert device having a flange configured to be engaged between the circular flange portion of the inlet safety head and the circular flange portion of the outlet safety head.

7. The safety head assembly of claim 5, further comprising:
  a pin;
  wherein the inlet safety head further defines a first pin hole, wherein the outlet safety head further defines a second pin hole; and
  wherein the pin is configured to keep the inlet safety head in alignment with the outlet safety head when inserted into the first pin hole and second pin hole.

8. A safety head assembly, comprising:
  an inlet safety head comprising:
    a body having an inner bore defining a fluid flow path, the body also having a flange portion; and at least one inlet safety head projection projecting outwardly from the body of the inlet safety head, the at least one inlet safety head projection having a face exhibiting a blended radius of curvature, wherein the at least one inlet safety head projection is a wave;

an outlet safety head comprising:
a body having an inner bore defining a fluid flow path, the body also having a flange portion; and
at least one outlet safety head projection projecting outwardly from the body of the outlet safety head, the at least one outlet safety head projection having a face exhibiting a blended radius of curvature, wherein the at least one outlet safety head projection is a wave;

wherein the flange portion of the inlet safety head and the flange portion of the outlet safety head are configured to receive an insert device placed between them.

9. The safety head assembly of claim 8, wherein the at least one inlet safety head projection is a handle, and wherein the at least one outlet safety head projection is a handle.

10. The safety head assembly of claim 8, wherein the at least one inlet safety head projection is thinner than the body of the inlet safety head.

11. The safety head assembly of claim 8, wherein the at least one outlet safety head projection is thinner than the body of the outlet safety head.

12. The safety head assembly of claim 8, wherein the at least one inlet safety head projection includes a through-bore defining a first bolt hole, wherein the at least one outlet safety head projection includes a through-bore defining a second bolt hole, and wherein the first and second bolt holes align such that a bolt securing the safety heads through the aligned bolt holes can be viewed between the at least one inlet safety head projection and the at least one outlet safety head projection.

13. The safety head assembly of claim 8, wherein the inlet safety head defines at least a first pin hole, and wherein the outlet safety head defines at least a second pin hole, and wherein the safety head assembly further comprises:
an alignment pin having a first end and a second end,
wherein the first end is configured to fit within the at least a first pin hole; and
wherein the second end is configured to fit within the at least a second pin hole.

14. The safety head assembly of claim 13, wherein the inlet safety head further includes at least one boss and wherein the at least a first pin hole is defined within the at least one boss.

15. The safety head assembly of claim 13, wherein the outlet safety head further includes at least one raised spot face and wherein the at least a second pin hole is defined within the at least one raised spot face.

16. The safety head assembly of claim 8, further comprising:
a safety head insert member having an inner bore defining a fluid flow path;
wherein the safety head insert member is configured to fit within the inner bore of the inlet safety head.

17. The safety head assembly of claim 16, further comprising:
a ridged portion extending from the safety head insert member;
wherein the ridged portion is configured to bitingly seal with an insert device.

18. The safety head assembly of claim 16, wherein the insert member is manufactured from a noble metal.

19. The safety head of claim 16, wherein the insert member is manufactured from a plastic or composite material.

20. The safety head of claim 16, wherein the insert member is manufactured from a ceramic material.

21. The safety head assembly of claim 16, further comprising:
an O-ring;
wherein the O-ring is configured to create a seal between the safety head insert member and an insert device.

22. The safety head assembly of claim 16, further comprising:
a serration defined by the safety head insert member;
wherein the serration is configured to seal with an insert device.

23. The safety head assembly of claim 8 further including an insert device configured to be placed between the two insert flange portions.

24. The safety head assembly of claim 23, wherein the insert device is a rupture disk.

25. The safety head assembly of claim 8, wherein the inner bore of the body of the inlet safety head is a first bore having a central axis, wherein the inlet safety head further comprises a second bore extending radially away from the central axis.

26. The safety head assembly of claim 25, further comprising:
a sensor mounted within the second bore.

27. The safety head assembly of claim 8, wherein the inner bore of the body of the outlet safety head is a first bore having a central axis, wherein the outlet safety head further comprises a second bore extending radially away from the central axis.

28. The safety head assembly of claim 27, further comprising:
a sensor mounted within the second bore.

* * * * *